United States Patent
Wilson et al.

(10) Patent No.: US 11,677,822 B2
(45) Date of Patent: Jun. 13, 2023

(54) PORTAL MANAGEMENT

(71) Applicant: ServiceNow, Inc., Santa Clara, CA (US)

(72) Inventors: Patrick Wilson, San Diego, CA (US); James Capaldo, San Diego, CA (US); Murray Newton, Tracy, CA (US)

(73) Assignee: ServiceNow, Inc., Santa Clara, CA (US)

( * ) Notice: Subject to any disclaimer, the term of this patent is extended or adjusted under 35 U.S.C. 154(b) by 239 days.

(21) Appl. No.: 15/723,703

(22) Filed: Oct. 3, 2017

(65) Prior Publication Data

US 2019/0104168 A1   Apr. 4, 2019

(51) Int. Cl.
| | |
|---|---|
| *H04L 67/1097* | (2022.01) |
| *H04L 67/02* | (2022.01) |
| *H04L 67/1095* | (2022.01) |
| *H04L 67/10* | (2022.01) |
| *H04L 65/40* | (2022.01) |
| *G06F 16/33* | (2019.01) |

(52) U.S. Cl.
CPC .......... *H04L 67/1097* (2013.01); *H04L 65/40* (2013.01); *H04L 67/02* (2013.01); *H04L 67/10* (2013.01); *H04L 67/1095* (2013.01); *G06F 16/33* (2019.01)

(58) Field of Classification Search
CPC ..... H04L 67/06; H04L 67/1097; H04L 67/02; H04L 67/1095; H04L 67/10; H04L 29/08
See application file for complete search history.

(56) References Cited

U.S. PATENT DOCUMENTS

| | | | |
|---|---|---|---|
| 6,321,229 B1 | 11/2001 | Goldman | |
| 6,636,894 B1 | 10/2003 | Short et al. | |
| 7,020,706 B2 | 3/2006 | Cates | |
| 7,133,901 B1 | 11/2006 | Dalby et al. | |
| 7,716,353 B2 | 5/2010 | Golovinsky | |
| 7,725,435 B1* | 5/2010 | Li | G06F 16/972 707/626 |
| 7,769,718 B2 | 8/2010 | Murley | |
| 79,254,981 | 4/2011 | Pourheidari | |
| 8,151,261 B2 | 4/2012 | Sirota et al. | |
| 8,402,127 B2 | 3/2013 | Solin | |
| 8,612,408 B2 | 12/2013 | Trinon | |
| 8,612,582 B2 | 12/2013 | Dare et al. | |
| 8,646,093 B2 | 2/2014 | Myers | |
| 8,819,539 B1 | 8/2014 | Colton et al. | |
| 8,832,652 B2 | 9/2014 | Mueller | |
| 9,098,322 B2 | 8/2015 | Apte | |
| 9,317,327 B2 | 4/2016 | Apte | |
| 9,363,252 B2 | 6/2016 | Mueller | |

(Continued)

*Primary Examiner* — Jimmy H Tran

(74) *Attorney, Agent, or Firm* — Fletcher Yoder PC

(57) ABSTRACT

A method includes transmitting initial page data from a service platform customer instance to a client device. The initial page data representing a first page of a portal, and the first page includes a widget associated with a second page. The method further includes receiving, from the client device, a selection of the widget. The method further includes obtaining mapping data indicating an association between the second page and a third page, the association specific to the portal. The method further includes, in response to the selection and the association, routing the client device to the third page rather than the second page.

17 Claims, 16 Drawing Sheets

(56) References Cited

U.S. PATENT DOCUMENTS

| | | |
|---|---|---|
| 9,645,833 B2 | 5/2017 | Mueller |
| 9,654,473 B2 | 5/2017 | Miller |
| 9,654,833 B2 | 5/2017 | Mueller |
| 9,766,935 B2 | 9/2017 | Kelkar |
| 9,773,020 B2* | 9/2017 | Kerr .................. H04W 12/0401 |
| 9,805,322 B2 | 10/2017 | Kelkar |
| 2001/0039540 A1* | 11/2001 | Hofmann ................ H04L 61/45 |
| 2002/0029296 A1* | 3/2002 | Anuff .................... G06F 16/954 |
| | | 719/311 |
| 2002/0035593 A1* | 3/2002 | Salim ..................... G06Q 10/10 |
| | | 709/202 |
| 2003/0163513 A1* | 8/2003 | Schaeck ................. G06Q 30/02 |
| | | 709/201 |
| 2004/0031058 A1* | 2/2004 | Reisman ............... G06F 16/954 |
| | | 725/112 |
| 2004/0123238 A1* | 6/2004 | Hefetz .................... G06F 9/451 |
| | | 715/234 |
| 2005/0097008 A1* | 5/2005 | Ehring ................. G06F 17/211 |
| | | 715/205 |
| 2005/0166188 A1* | 7/2005 | Secrist ...................... G06F 8/10 |
| | | 717/136 |
| 2006/0041641 A1* | 2/2006 | Breiter ................. G06F 9/5072 |
| | | 709/219 |
| 2006/0107314 A1* | 5/2006 | Cataldi ................ G06F 16/958 |
| | | 707/E17.116 |
| 2006/0122861 A1* | 6/2006 | Scott ....................... G06Q 10/00 |
| | | 705/7.19 |
| 2006/0195779 A1* | 8/2006 | McElroy ............. G06F 16/972 |
| | | 715/204 |
| 2006/0206856 A1* | 9/2006 | Breeden ................... G06F 8/20 |
| | | 717/101 |
| 2006/0294495 A1* | 12/2006 | Smith ................... G06F 16/958 |
| | | 717/105 |
| 2007/0033293 A1* | 2/2007 | Rumelhart .............. H04L 45/30 |
| | | 709/238 |
| 2007/0124364 A1* | 5/2007 | Hackworth ........... G06F 16/972 |
| | | 709/203 |
| 2007/0130293 A1* | 6/2007 | Dong .................. G06F 16/9574 |
| | | 709/219 |
| 2008/0052369 A1* | 2/2008 | Weber ................. G06F 16/954 |
| | | 709/217 |
| 2008/0270391 A1* | 10/2008 | Newbold ............ G06F 16/9535 |
| 2008/0301299 A1* | 12/2008 | Cahill ................... H04L 67/306 |
| | | 709/226 |
| 2009/0113310 A1* | 4/2009 | Appleyard ............. G06Q 10/00 |
| | | 715/742 |
| 2009/0138476 A1* | 5/2009 | Zimler ................ H04L 12/2821 |
| | | 707/999.009 |
| 2009/0204883 A1* | 8/2009 | Talanis ................ G06F 16/972 |
| | | 715/234 |
| 2010/0145718 A1* | 6/2010 | Elmore ................... G06Q 30/04 |
| | | 719/315 |
| 2010/0192067 A1* | 7/2010 | Casalaina ......... G06F 16/24573 |
| | | 715/752 |
| 2010/0325602 A1* | 12/2010 | Kraft, IV .................. G06F 8/71 |
| | | 717/103 |
| 2011/0060838 A1* | 3/2011 | Yeung ............... H04L 29/12066 |
| | | 709/228 |
| 2011/0225041 A1* | 9/2011 | Quilici ............... G06Q 30/0269 |
| | | 705/14.51 |
| 2012/0021720 A1* | 1/2012 | Jiang ..................... H04M 15/08 |
| | | 379/189 |
| 2012/0054625 A1* | 3/2012 | Pugh .................... H04L 63/0815 |
| | | 715/736 |
| 2013/0059534 A1* | 3/2013 | Sobalvarro ............. H04W 4/50 |
| | | 455/41.1 |
| 2013/0091090 A1* | 4/2013 | Spivack ................ G06F 16/958 |
| | | 707/608 |
| 2013/0166577 A1* | 6/2013 | Barak ................. G06F 16/9535 |
| | | 707/754 |
| 2013/0254180 A1* | 9/2013 | McFarlane ........... G06F 3/0484 |
| | | 715/764 |
| 2014/0033021 A1* | 1/2014 | Tsao ........................ B66C 1/422 |
| | | 715/234 |
| 2014/0040153 A1* | 2/2014 | Singh ..................... G06Q 50/26 |
| | | 705/320 |
| 2014/0040343 A1* | 2/2014 | Nickolov ................. H04L 69/32 |
| | | 709/201 |
| 2014/0055803 A1* | 2/2014 | Uhlig .................... G06F 17/212 |
| | | 358/1.13 |
| 2014/0108132 A1* | 4/2014 | De Gour ............ G06Q 30/0246 |
| | | 705/14.45 |
| 2014/0164893 A1* | 6/2014 | Pariente ............... G06F 16/986 |
| | | 715/207 |
| 2014/0237375 A1* | 8/2014 | Schachtel .............. H04L 67/02 |
| | | 715/741 |
| 2014/0282633 A1 | 9/2014 | Fiero |
| 2014/0289640 A1* | 9/2014 | Poornachandran ... G06F 17/212 |
| | | 715/745 |
| 2015/0106736 A1* | 4/2015 | Torman ................. G06F 16/907 |
| | | 715/745 |
| 2015/0248280 A1* | 9/2015 | Pillay ........................ G06F 8/60 |
| | | 717/106 |
| 2016/0013970 A1* | 1/2016 | Taylor .................. H04L 41/0663 |
| | | 370/217 |
| 2016/0127358 A1* | 5/2016 | Engelking ........... H04W 12/088 |
| | | 713/156 |
| 2016/0162173 A1* | 6/2016 | Chandra ................ G06F 16/957 |
| | | 715/747 |
| 2016/0182681 A1* | 6/2016 | Shao .................... H04L 67/2814 |
| 2016/0234664 A1* | 8/2016 | Vendrow ............. H04M 3/5141 |
| 2016/0241668 A1* | 8/2016 | Rajkumar ........... H04L 29/0809 |
| 2016/0321050 A1* | 11/2016 | Compton ........... G06Q 30/0209 |
| 2017/0351778 A1* | 12/2017 | Sperling ................. G06F 16/38 |
| 2018/0129511 A1* | 5/2018 | Krzyzanowski ........ G06F 9/451 |
| 2019/0236825 A1* | 8/2019 | Straub ..................... G06T 11/60 |
| 2022/0245329 A1* | 8/2022 | Beechuk ................ H04L 67/00 |

* cited by examiner

300

Page Reroute Entry

| | | |
|---|---|---|
| Short Description | Page 2 now rerouting to page 3 | — 302 |
| Portal(s) | HR | — 304 |
| Route From | Page 2 | — 306 |
| Route to | Page 3 | — 308 |
| Active | ☑ ← 310 | |
| Order | 10 | — 312 |

Update   Delete
  ↑        ↑
  314      316

*FIG. 3*

Page Reroute Table

| Short Description | Portal(s) | Route from | Route to | Active | Order |
|---|---|---|---|---|---|
| Search | Search | Search | Search | Search | Search |
| Page 2 now rerouting to page 3 | HR | Page 2 | Page 3 | true | 10 |

Create Page

500 →

Page Name: Catalog
ID: SV_catalog

Application: Global
Public
Draft
Roles

Short Description
Page Specific CSS
Page title: %item | Portal Catalog ← 502
Page Content

*FIG. 5*

Dynamic page title variables table

| URL query parameter | Table field | Table | Name |
|---|---|---|---|
| sys_id | Short Description | Catalog Item | %item |

Dynamic metatag variables table

| URL query parameter | Table field | Table | Name |
|---|---|---|---|
| sys_id | Short Description | Catalog Item | %item |

*FIG. 10*

Create Announcement

| | |
|---|---|
| Name | Wi-Fi |
| Title | Wi-Fi Down |
| From | 201 |
| Body | The |
| Display Style | Urg |
| Glyph | |
| Public | |
| Roles | ✎ |

Active ▽

Roles — 1302

Available:
- Role 1
- Role 2
- Role 3
- Role 4

Selected:
- Role 2

[Done]

*FIG. 13*

PORTAL MANAGEMENT

TECHNICAL FIELD

Embodiments described herein generally relate to a portal management.

BACKGROUND ART

Enterprises may provide Internet accessible information portals to users. Such information portals may include human resources information and/or functions, technology support information and/or functions, etc. As an information portal includes more and more informational and functional elements, complexity of maintaining the information portal grows. For example, updating each element that links to a page in response to creation of an updated page may be tedious and time consuming.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

According to one embodiment of the present disclosure, a method includes transmitting initial page data from a service platform customer instance to a client device. The initial page data representing a first page of a portal, and the first page includes a widget associated with a second page. The method further includes receiving, from the client device, a selection of the widget. The method further includes obtaining mapping data indicating an association between the second page and a third page, the association specific to the portal. The method further includes, in response to the selection and the association, routing the client device to the third page rather than the second page.

In another embodiment of the present disclosure, a computer-readable storage device stores instructions that that, when executed by one or more processors, cause the one or more processors to perform operations that include transmitting initial page data from a service platform customer instance to a client device, the initial page data representing a first page of a portal, wherein the first page includes a widget associated with a second page. The operations further include receiving, from the client device, a selection of the widget. The operations further include obtaining mapping data indicating an association between the second page and a third page, the association specific to the portal. The operations further include, in response to the selection and the association, routing the client device to the third page rather than the second page.

In another embodiment of the present disclosure, a system includes one or more processors and one or more memory devices storing instructions, that when executed by the one or more processors, cause the one or more processors to perform operations. The operations include transmitting initial page data from a service platform customer instance to a client device, the initial page data representing a first page of a portal, wherein the first page includes a widget associated with a second page. The operations further include receiving, from the client device, a selection of the widget. The operations further include obtaining mapping data indicating an association between the second page and a third page, the association specific to the portal. The operations further include, in response to the selection and the association, routing the client device to the third page rather than the second page.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 3 is a diagram of a screen of a graphical user interface (GUI) for configuring a portal;

FIG. 5 is diagram of another screen of the for configuring the portal;

FIG. 7 is diagram of another screen of the for configuring the portal;

FIG. 10 is diagram of another screen of the for configuring the portal;

FIG. 13 is diagram of another screen of the for configuring the portal;

DESCRIPTION OF EMBODIMENTS

Figure 1:
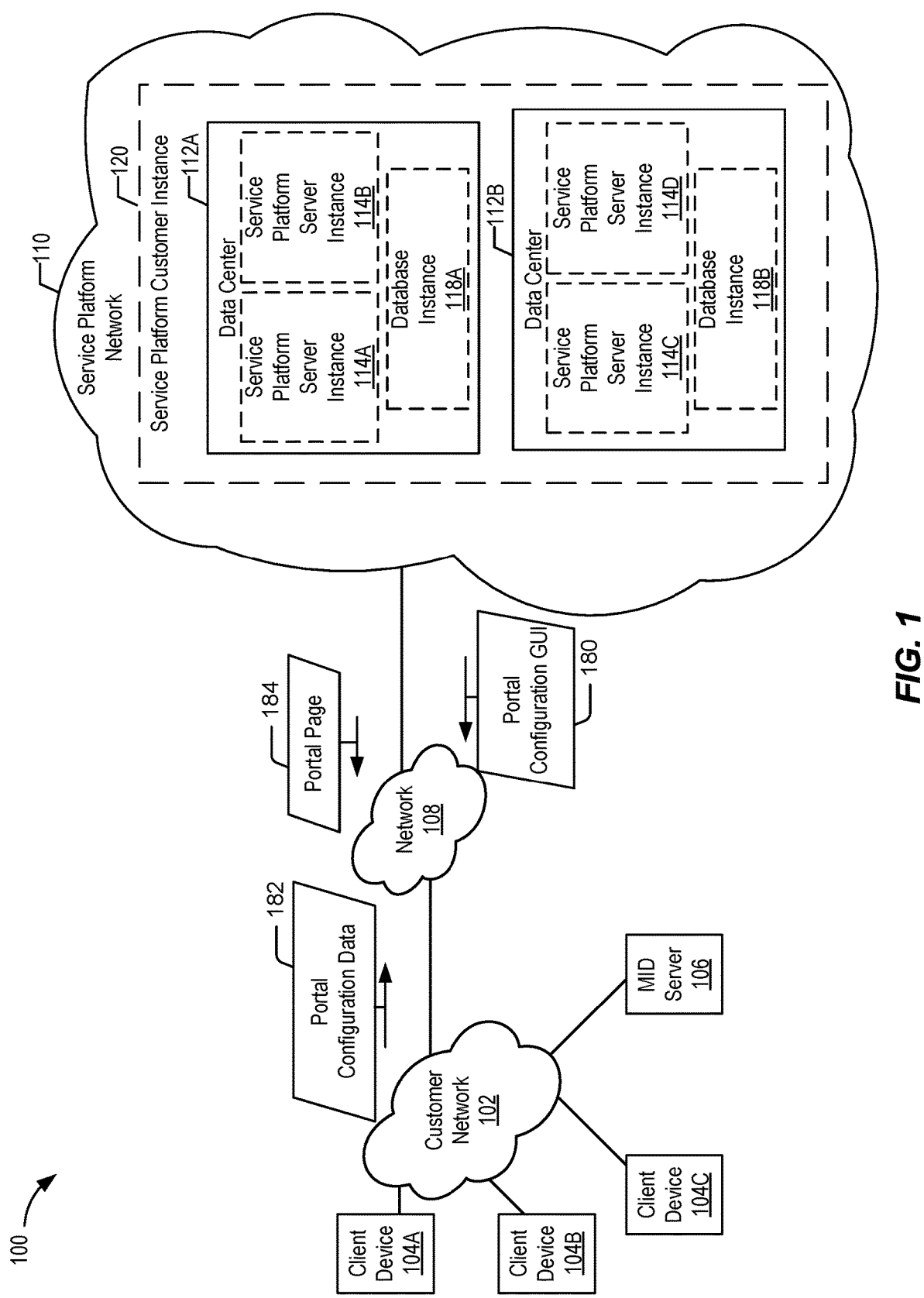
FIG. 1 is a schematic diagram of a system for portal management.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing device" may refer to a device that includes, but is not limited to a single computer, host, server, laptop, and/or mobile device.

As used herein, a computer-readable storage device is an article of manufacture.

As used herein, the term "network device" may refer to any device that is capable of communicating and transmitting data to another device across any type of network.

As used herein, the term "computing system" may refer to a single electronic computing device or network device that includes, but is not limited to a single computer, virtual machine, virtual container, host, server, laptop, and/or mobile device. The term "computing system may also refer to a plurality of electronic computing devices and/or network devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Sequences of method steps presented herein are provided as examples and are not meant to be limiting. Thus, methods according to the disclosure may be performed in an order alternative to that illustrated in the figures and described herein. To illustrate, a method described as including steps "A" and "B" may be performed with "A" either preceding or following "B," unless a specific order is indicated.

Systems and methods according to the present disclosure may enable capability based planning. In particular, a system may generate capability scores for a plurality of capabilities associated with a customer network. In addition, the system may provide a technology risk assessment of applications used by the customer network for the capabilities.

FIG. 1 is a schematic diagram of an embodiment of a computing system 100 (e.g., a cloud computing system) where embodiments of the present disclosure may operate. The computing system 100 includes a customer network 102, a network 108, and a service platform network 110. In some embodiments, the customer network 102 includes a local private network, such as local area network (LAN) that includes a variety of network devices (e.g., switches, servers, routers, etc.). In some embodiments, the customer network 102 corresponds to an enterprise network that includes one or more LANs, virtual networks, data centers, other remote networks, or a combination thereof. As shown in FIG. 1, the customer network 102 is communicatively coupled to client devices 104A-C so that the client devices 104A-C are able to communicate with each other via the customer network 102. The client devices 104A-C may be computing systems and/or other types of computing devices that access cloud computing services, for example, via a web browser application. FIG. 1 also illustrates that the customer network 102 includes a management, instrumentation, and discovery (MID) server 106 that facilitates communication of data between the service platform network 110, other external applications, data sources, and services, and the customer network 102. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to the network 108, which is further coupled to the service platform network 110. The network 108 is configured to transmit messages between the service platform network 110 and the customer network 102, the MID server 106 and the client devices 104A-C. As described herein, the service platform network 110, is configured to provide one or more portals (e.g., a service portal) based on input from devices associated with the customer network 102. The portal(s) are accessible (e.g., via the network 108) to devices associated with the customer network 102 and other devices.

The network 108 includes one or more computing networks available today, such as other LANs, wide area networks (WAN), the Internet, and/or other remote networks. Each of the computing networks within the network 108 may contain wired and/or wireless programmable devices that operate in the electrical and/or optical domain. For example, the network 108 may include wireless networks, such as cellular networks (e.g., Global System for Mobile Communications (GSM) based cellular network) wireless fidelity (Wi-Fi®) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, the network 108 may include a variety of network devices, such as servers, routers, network switches, and/or other network hardware devices configured to transport data over networks.

The service platform network 110 is a remote network (e.g., a cloud network) that provides one or more services to devices, such as devices associated with the customer network 102, via the network 108. To illustrate, the service platform network 110 may act as a platform that provides additional computing resources to the client devices 104A-C and/or customer network 102. For example, by utilizing the developmental the service platform network 110, users of the client devices 104A-C may be able to build and execute applications, such as automated processes for various enterprise, information technology (IT), and/or other organization-related functions.

The service platform network 110 includes data centers 112A-B. Each of the data centers 112A-B may be located in different geographic location. Each of the data centers 112A-B includes one or more computing devices configured to provide one or more instances of one or more services.

In the example, of FIG. 1, devices of the datacenter 112A provide service platform server instances 114A-B and a database instance 118A while devices of the data center 112B provides server instances 114C-D and a database instance 118B. Examples of server instances include application server instances, web server instances, etc. accessible to customer devices (e.g., the client devices 104A-C). Database instances are distinct databases that store customer data. Each server instance 114 and each database instance 118 can be implemented on a physical computing system that includes a single electronic computing device (e.g., a single physical hardware server) or multiple-computing device (e.g., multiple physical hardware servers). A single computing device may provide more than one server instance 114 and/or database instance 118.

In the example of FIG. 1, the service platform network 110 is arranged in a multi-instance cloud architecture. In a multi-instance cloud architecture, the service platform network 110 provides services to a plurality of customers and resources (e.g., instances) of the data centers 112A-B are grouped into service platform customer instances associated with the plurality of customers, where each service platform customer instance is unique to a customer. Each resource (e.g., instance) included in a service platform customer instance is unique to that service platform customer instance. Accordingly, data stored in one customer's database instance may not be mixed with data stored in another customer's database instance and server instances that provide services to one customer may not provide services to another customer. Further, one of the datacenters 112A-B may actively provide services to a customer while the other datacenter mirrors the active datacenter. In response to an error or a scheduled update to the active datacenter, the mirror datacenter may begin actively providing services to the customer.

Since each customer has its own unique software stack (e.g., instances) in the multi-instance cloud architecture, each customer's data is isolated from other customer's data. Accordingly, individual clients are not put at risk by security practices of other clients. Further, each customer may determine its own upgrade schedule. In addition, since each client instance is mirrored to a second datacenter, services provided by the client instances may be more readily available during maintenance and upgrades. In alternative embodiments, the system 100 may have more or fewer components arranged in different combinations. For example, the service platform network 110 may include more than two data centers.

In the illustrated example, a service platform customer instance 120 is associated with a customer who uses (e.g., owns, operates, etc.) the customer network 102. The service platform customer instance 120 includes the service platform server instances 114A-D and the database instances 118A-B. Accordingly, the service platform server instances 114A-D and the database instances 118A-B provide one or more services to the customer associated with the customer network 102. Such services may include enhancing capabilities of the customer network 102, providing analysis of the customer network 102, hosting one or more portals accessible to the customer network 102 and other devices (e.g., via a web interface) associated with the client, etc. In particular, as described herein, the service platform customer instance 120 provides capability based planning and technology risk assessment tools to an operator of the customer network 102.

In an illustrative example of the system 100, the service platform server instance 114A corresponds to a portal application accessible to devices associated with the customer network 102, via a web interface or via other means, to create a portal. In some examples, the service platform server instance 114A may further provide access to the portal to devices (e.g., the client devices 104A-C or other computing devices). In other examples, the service platform server instance 114B provides access to the portal to devices (e.g., the client devices 104A-C or other computing devices). For example, the service platform server instance 114B may correspond to a web server application that provides web content corresponding to the portal to devices via the network 108. The database instance 118A stores data associated with the portal. The service platform server instances 114C-D and the database instance 118B correspond to a mirrored versions of the service platform server instance 114A-B and the database instance 118A respectively.

In operation, the service platform customer instance 120 (e.g., the service platform server instance 114A) transmits a portal configuration graphical user interface (GUI) 180 to one of the client devices 104A-C. A user of the client device (e.g., the client device 104A) interacts with the portal configuration GUI 180 to cause the client device to transmit portal configuration data 182 to the service platform customer instance 120. That is, the portal configuration data 182 corresponds to one or more inputs to the GUI 180. Based on the portal configuration data 182, the service platform customer instance 120 (e.g., the service platform server instance 114A) generates or alters a portal. The portal corresponds to a collection of one or more pages (e.g., web pages) that include textual information, widgets, and other elements. A widget is an object that defines content of a portal. A widget may include a hypertext markup language (HTML) template, a client script, a server script, a cascading stylesheet (CSS), a link function, one or more options, or a combination thereof. The HTML template and the CSS define how a widget appears when rendered by a device as part of a page. The client script defines behavior of the widget on a client device. The server script defines how the widget interacts (e.g., updates, retrieves data from, etc.) with the service platform customer instance 120. The one or more options control how individual instances of the widget behave. Data associated with the portal is stored in the database instances 118A-B. As described further herein, the portal created by the service platform customer instance 120 supports page rerouting, dynamic page titles, dynamic metatags, announcements, or a combination thereof. Accordingly, the portal configuration GUI 180 may provide one or more functions to configure such features and the portal configuration data 182 may indicate information related to such features.

The portal is accessible to one or more devices via the network 108. For example, the portal may correspond to a website accessible via the World Wide Web. To illustrate, the service platform server instance 114B (and the service platform server instance 114D) may correspond to a web server application configured to provide the portal to a device that sends a hypertext transfer protocol (HTTP) GET request to service platform server instance 114B. In the example of FIG. 1, the service platform customer instance 120 sends a portal page 184 of the portal to a device of the customer network 102. The portal page 184 may include one or more announcements, as described further herein. In addition, the portal page 184 may include one or more metatags that the service platform customer instance 120 dynamically determines. Further, the portal page 184 may have a title dynamically determined by the service platform customer instance 120. Further, the service platform customer instance 120 may be configured to reroute page requests.

Accordingly, FIG. 1 illustrates a system for creating, altering, and accessing a portal. As described further herein, the portal may support various features, such as page rerouting, dynamic page titles, dynamic metatags, and announcements. Accordingly, development and interaction with the portal may be more convenient as compared to other portals.

Figure 2:
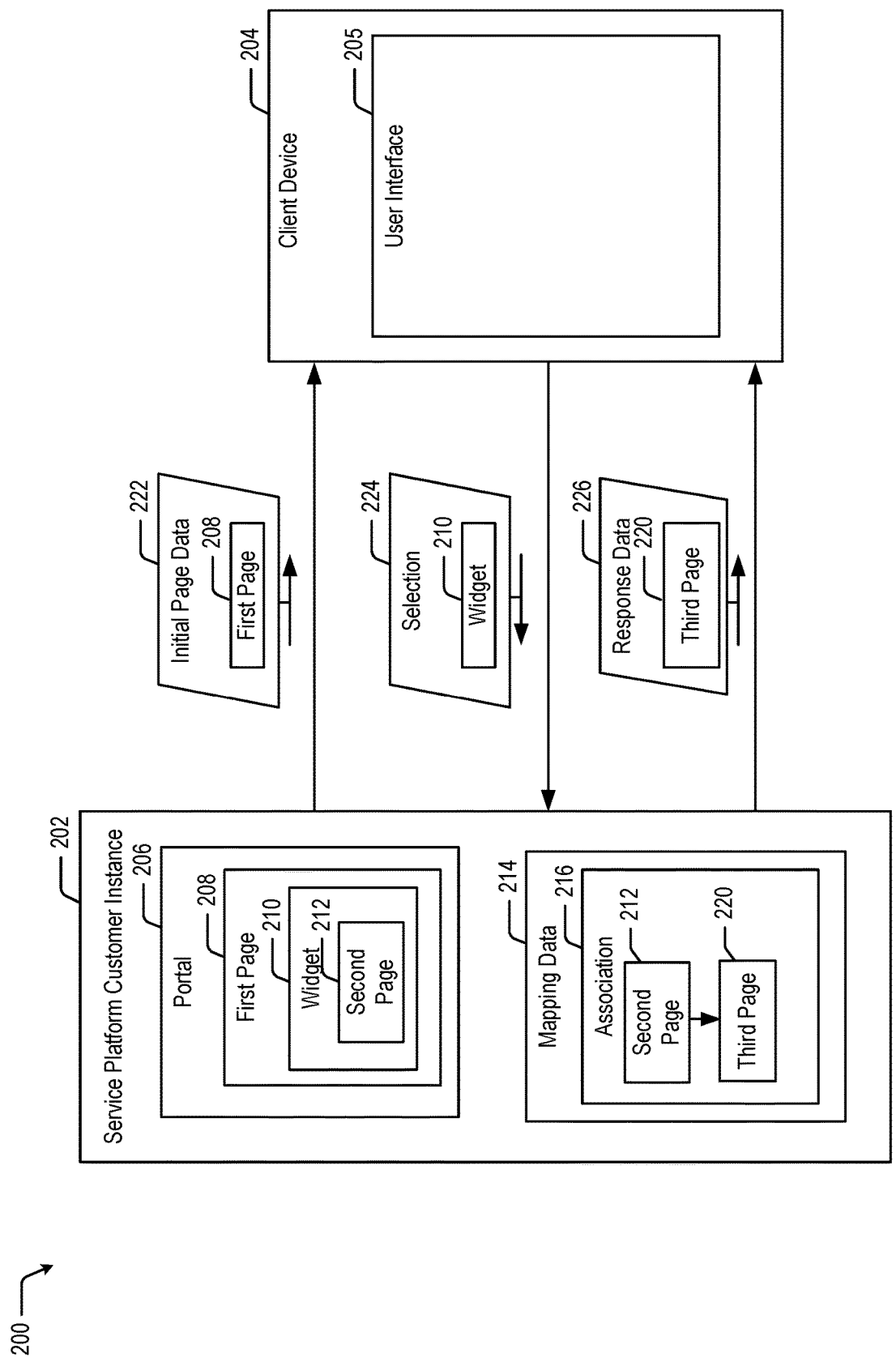
FIG. 2 is a schematic diagram of another system for portal management.

Referring to FIG. 2, a diagram of a system 200 for redirecting a page request is shown. The system 200 may correspond to the system 100 of FIG. 1. The system 200 includes a service platform customer instance 202 and a client device 204. The service platform customer instance 202 may correspond to the service platform customer instance 120 of FIG. 1. The client device 204 may correspond to one of the client devices 104A-C or to a device that has access to the service platform network 110 via the network 108.

As illustrated in FIG. 2, the service platform customer instance 202 stores data associated with a portal 206 that includes a first page 208. The portal 206 may have been created by the service platform customer instance 202 as described with reference to FIG. 1 (e.g., based on the portal configuration data 182 received responsive to the portal configuration GUI 180). The first page 208 includes a widget 210 that links to a second page 212. The second page 212 may be a page of the portal 206 or may be an external page hosted by at a web server not illustrated in FIG. 2. The service platform customer instance 202 further stores mapping data 214. The mapping data 214 includes an association 216 indicating that requests for the second page 212 are to be rerouted to a third page 220. In some examples, the mapping data 214 is received as part of portal configuration data (e.g., the portal configuration data 182). The association 216 may be specific to the portal 206. For example, the portal 206 may correspond to a human resources (HR) portal and the association 216 may only apply for requests for the second page 212 that originate from the human resources portal. Accordingly, the service platform customer instance 202 may not reroute requests for the second page 212 originating from a technology support portal.

In operation, the client device 204 executes a user interface 205 (e.g., a web browser). A user of the client device 204 uses the user interface 205 to navigate to the first page 208 of the portal 206. Accordingly, the service platform customer instance 202 transmits initial page data 222 representing the first page 208 to the client device. Responsive to the user of the client device 204 selecting the widget 210 via the user interface 205, the client device 204 transmits a selection 224 of the widget 210 to the service platform customer instance 202. The selection 224 may include an identifier of the widget 210 or a uniform resource locator (URL) of the second page 212. In response to the selection 224 and the association 216, the service platform customer instance 202 routes the client device 204 to the third page 220 by transmitting response data 226 to the client device 204. The response data 226 may include content of the third page 220 or a URL of the third page 220.

As explained above, the association is 216 is specific to the portal 206. Thus, if a second client device accessing a second portal provided by the service platform customer instance 202 selects a second widget that links to the second page 212, the service platform customer instance 202 may route the second client device to the second page 212. In general associations included in the mapping data 214 may be associated with one or more portals.

While described as performing rerouting in response to selection of a widget, the service platform customer instance 202 may perform rerouting in other contexts as well. For example, the widget 210 may be configured to automatically access data at a first location to obtain data to display as part of the first page 208. In response to a request, generated by the widget, to access the data at the first location and the mapping data 214 indicating the first location is to be rerouted to a second location, the service platform customer instance 202 may transmit data from the second location or a URL of the second location to the widget 210. Accordingly, the widget 210 may cause the user interface 205 to display the data from the second location as part of the first page 208

Thus, FIG. 2 illustrates how a service platform customer instance may support page reroutes. Defining mapping data indicating page rerouting rules may be more convenient for a portal developer (e.g., a user who interacts with the portal configuration GUI 180) than updating each widget associated with a first page when a new page is created to replace the first page.

Referring to FIG. 3, a diagram of a first screen 300 of a GUI for configuring a portal is shown. The GUI is displayed by a client device creating or configuring a portal, as described with reference to FIG. 1. The first screen 300 may correspond to a screen of the GUI 180 and is usable to create, edit, or delete a page reroute rule (e.g., the association 216). In the illustrated example, the first screen 300 includes GUI elements 302-316. Implementations of the GUI (including the first screen 300) may include different GUI elements and/or a different arrangement of GUI elements. Further, depicted GUI elements (e.g., GUI elements 302-316) are not limited to the element types shown. For example, an element illustrated as a text box may be implemented as a drop down menu, etc.

The first GUI element 302 is a text box in which a short description of a routing rule may be entered. In the illustrated example, the first GUI element 302 has been populated with the string "Page 2 now rerouting to page 3.

The second GUI element 304 is a text box in which portal names may be entered. Content of the second GUI element 304 defines to which portal(s) the page reroute entry (e.g., the association 216) applies. The page reroute entry may be defined as applying to all portals associated with a service platform customer instance (e.g., by entering "global" into the second GUI element 304 or by leaving the second GUI element 304 blank). In the example of FIG. 3, the second GUI element 304 has been populated with the string "HR" indicating that the page reroute entry defined by the first screen 300 is to apply to page requests originating from a human resources portal.

The third GUI element 306 and the fourth GUI element 308 are text boxes in which pages may be identified. The page identified in the third GUI element 306 is to be redirected to the page identified in the fourth GUI element 308. The pages may be identified based on URLs, page names, page identifiers, etc. A page identifier may correspond to a unique identifier of a page within service platform customer instance (e.g., the service platform customer instance 120 or the service platform customer instance 202). In the example of FIG. 3, the third GUI element 306 has been populated with the string "Page 2" and the fourth GUI element 308 has been populated with the string "Page 3" indicating that a named Page 2 (e.g., the second page 212) is to be redirected to a page named Page 3 (e.g., the third page 220).

The fifth GUI element 310 is a checkbox in which an active status of the page reroute entry may be defined. Using the fifth GUI element 310 the page reroute entry may be set to an active or inactive status. A service platform customer instance (e.g., the service platform customer instance 120 or the service platform customer instance 202) ignores inactive page reroute entries when determining how to route a page request. In the example of FIG. 3, the fifth GUI element 310 has been set to indicate the page reroute entry is active.

The sixth GUI element 312 is a text box in which an order value may be identified. The order value defines a precedence of the page reroute entry. A service platform customer instance (e.g., the service platform customer instance 120 or the service platform customer instance 202) uses the order value to resolve conflicts between page reroute entries. For example, a first active page reroute entry may indicate that requests for "Page A" from portal "X" are to be routed to "Page B" while a second active page reroute entry indicates that requests for the "Page A" from the service portal "X" are to be routed to "Page C." In that case, the service platform customer instance determines whether to route a request for the "Page A" from the portal "X" according to the first active page reroute entry or the second active page reroute entry based on order values of the first active page reroute entry and the second active page reroute entry. To illustrate, in response to the order value of the first active page reroute entry exceeding the order value of the second active page reroute entry, the service platform customer instance may ignore the first active page reroute entry and route the request for the "Page A" according to the second active page reroute entry (or vice versa). In the example of FIG. 3, the sixth GUI element 312 has been populated with the string "10."

The seventh GUI element 314 is an update button. In response to selection of the update button, the GUI (e.g., the portal configuration GUI 180) generates portal configuration data (e.g., the portal configuration data 182) based on content of the GUI elements 302-312. The portal configuration data is transmitted by the client device (e.g., the client device 104A) displaying the GUI to the service platform customer instance (e.g., the service platform customer instance 120 or the service platform customer instance 202). Based on the portal configuration data, the service platform customer instance updates or creates the page reroute entry.

The eighth GUI element 316 is delete button. In response to selection of the delete button, the GUI (e.g., the portal configuration GUI 180) generates portal configuration data (e.g., the portal configuration data 182) deleting the page reroute entry associated with the first screen 300. The portal configuration data is transmitted by the client device (e.g., the client device 104A) displaying the GUI to the service platform customer instance (e.g., the service platform customer instance 120 or the service platform customer instance 202). In response, to the portal configuration data, the service platform customer instance deletes the page reroute entry.

Figure 4:
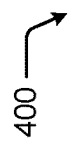
FIG. 4 is diagram of another screen of the for configuring the portal.

Referring to FIG. 4, a diagram of a second screen 400 of the GUI (e.g., the GUI 180) for configuring a portal is shown. The second screen 400 depicts a page reroute table that includes the page reroute entry defined as described with reference to FIG. 3. For example, in response to selection of the seventh GUI element 314 (the update button) of the first screen 300, the service platform customer instance (e.g., the service platform customer instance 120 or the service platform customer instance 202) may create or update the page reroute entry defined by the first screen 300 and update the GUI to display the second screen 400. Thus, FIGS. 3 and 4 illustrate a GUI usable to define a page reroute function of a service platform customer instance.

Referring to FIG. 5, a diagram of a third screen 500 of the GUI (e.g., the GUI 180) for configuring the portal is shown. The third screen 500 is usable to create a page of the portal. As explained above, the GUI may generate portal configuration data (e.g., the portal configuration data 182) based on values entered into the third screen 500. The portal configuration data generated based on the third screen 500 is used by a service platform customer instance (e.g., the service platform customer instance 120 or the service platform customer instance 202) to generate the page of the portal.

The third screen 500 includes various GUI elements associated with creating a page of a portal including a ninth GUI element 502. The ninth GUI element 502 is a text box in which a page title may be defined. Content of the ninth GUI element 502 may include a dynamic title to be resolved by the service platform customer instance (e.g., the service platform customer instance 120 or the service platform customer instance 202). A dynamic title includes a variable. In the example of FIG. 5, the ninth GUI element 502 has been populated with the string "% item|Portal Catalog." In the illustrated example, "%" indicates a variable. Accordingly the title entered into the ninth GUI element 502 is a dynamic title that includes a variable named "% item." The ninth GUI element 502 may include any number of variables. To resolve the dynamic title, the service platform customer instance identifies dynamic title variable definitions associated with the variables included in the dynamic title.

Figure 6:
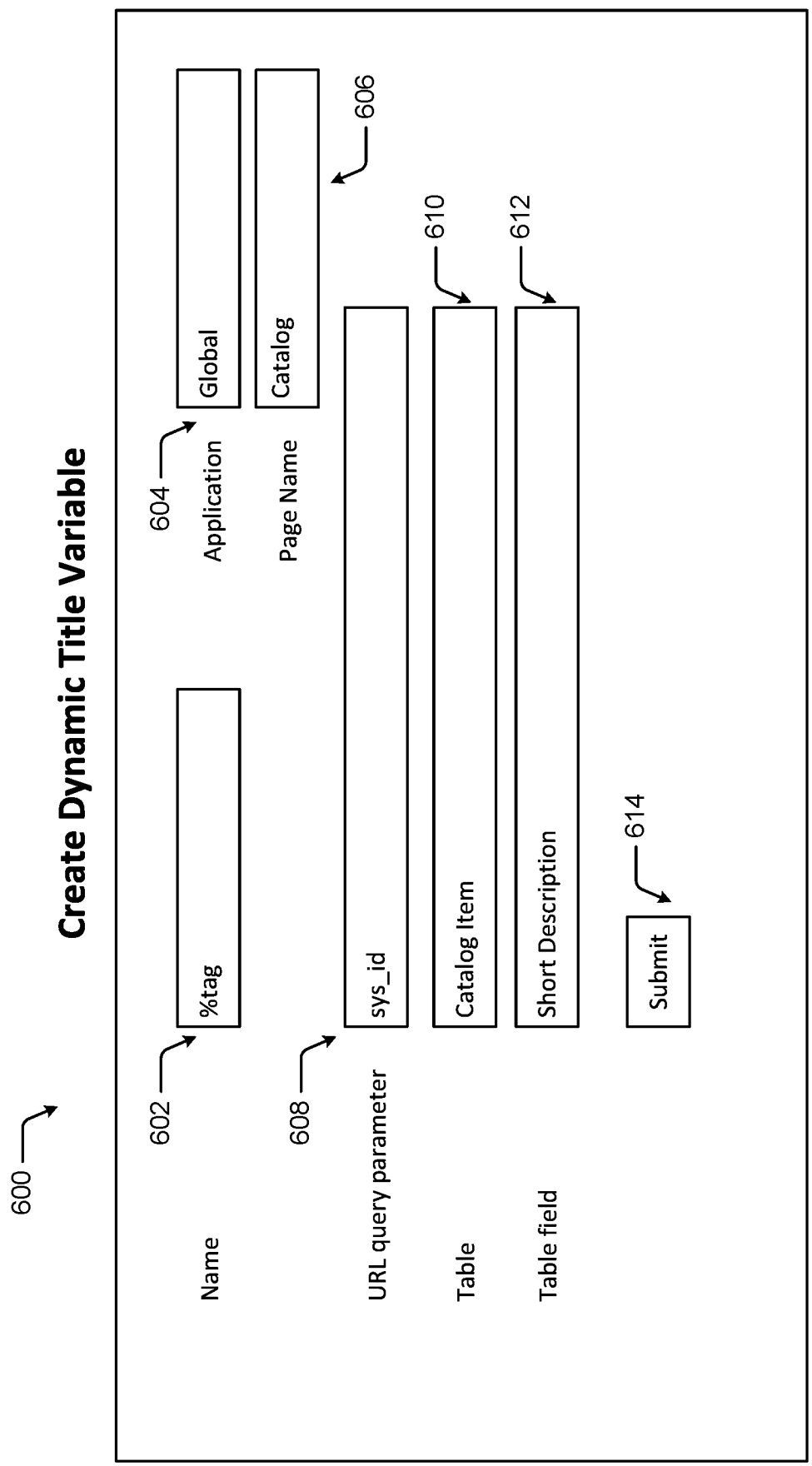
FIG. 6 is diagram of another screen of the for configuring the portal.

Referring to FIG. 6, a diagram of a fourth screen 600 of the GUI (e.g., the GUI 180) for configuring the portal is shown. The fourth screen 600 is usable to create a dynamic title variable definition (e.g., an entry in a table) used by the service platform customer instance to resolve a dynamic title. As explained above, the GUI may generate portal configuration data (e.g., the portal configuration data 182) based on values entered into the fourth screen 600. The portal configuration data generated based on the fourth screen 600 is used by the service platform customer instance (e.g., the service platform customer instance 120 or the service platform customer instance 202) to generate dynamic title variable definitions used to resolve dynamic page titles.

The fourth screen 600 includes a GUI elements 602-614. The tenth GUI element 602 is a text box in which a variable name may be entered. In the illustrated example, the tenth GUI element 602 has been populated with the string "% tag." Accordingly, the service platform customer instance may use the dynamic title variable definition created based on the fourth screen 600 to resolve a dynamic title that includes a variable "% tag."

The eleventh GUI element 604 is a text box in which one or more portals may be defined. The service platform customer instance (e.g., the service platform customer instance 120 or the service platform customer instance 202) uses the dynamic title variable definition created based on the fourth screen 600 to resolve dynamic titles associated with portals indicated by the eleventh GUI element 604. In the illustrated example, the eleventh GUI element 604 has been populated with the string "Global." "Global" indicates that the dynamic title variable definition defined in the fourth screen 600 is to be used to resolve dynamic titles associated with all portals associated with the service platform customer instance.

The twelfth GUI element 606 is a text box in which one a page name may be entered. The service platform customer instance (e.g., the service platform customer instance 120 or the service platform customer instance 202) uses the dynamic title variable definition created based on the fourth screen 600 to resolve a dynamic title of the page indicated by the twelfth GUI element 606. In the illustrated example, the twelfth GUI element 606 has been populated with the string "Catalog." Accordingly, the dynamic title variable definition defined in the fourth screen 600 is to be used to resolve dynamic titles associated with the page "Catalog." The page "Catalog" may include dynamically generated (e.g., by the service platform customer instance) content. Using a dynamic title, as described herein, to cause a title of the page to match dynamic content of a page rather than using a generic title may increase visibility of the page (or dynamically generated versions of the page) in search engine results. For example, a dynamically generated version of the catalog page may include a display of a "brand name" radio available for purchase. Using a dynamic title to cause the title of the dynamically generated version of the catalog page to read "brand name radio" rather than "catalog" may result in the dynamically generated version of the catalog page appearing in search results for "radio" provided by a third party searcher.

The thirteenth GUI element 608 is a text box in which one a URL query parameter may be entered. The URL query parameter corresponds to a field in a dynamically generated URL of a dynamically generated version of a page. In the illustrated example, the thirteenth GUI element 608 has been populated with a string "sys_id." Using catalog page example describe above to illustrate, a dynamically generated URL of the dynamically generated version of the catalog page that includes the display of the radio may include a string "sys_id=radio." In this example, the field sys_id is a URL query parameter with a value of radio.

The fourteenth GUI element 610 is a text box in which a data structure (e.g., a table) may be identified, and the fifteenth GUI element 612 is a text box in which a field (e.g., a column) of the data structure may be identified. The data structure may correspond to data within the service platform customer instance (e.g., stored in the database instances 118A-B) or may correspond to external data accessible via a network (e.g., the network 108). In the example of FIG. 6, the fourteenth GUI element 610 has been populated with a string "Catalog Item," and the fifteenth GUI element 612 has been populated with the string "Short Description."

The sixteenth GUI element 614 is a submit button. In response to selection of the submit button, the GUI (e.g., the portal configuration GUI 180) generates portal configuration data (e.g., the portal configuration data 182) based on content of the GUI elements 602-612. The portal configuration data is transmitted by the client device (e.g., the client device 104A) displaying the GUI to the service platform customer instance (e.g., the service platform customer instance 120 or the service platform customer instance 202). Based on the portal configuration data, the service platform customer instance creates the dynamic title variable definition.

To set a title of a page that includes a dynamic title, the service platform customer instance resolves the dynamic title (e.g., indicated by the ninth GUI element 502) of the page by identifying a variable in the dynamic title. The service platform customer instance identifies a dynamic title variable definition (e.g., the dynamic title variable definition defined in the fourth screen 600) based on the variable. Based on the dynamic title variable definition, the service platform customer instance identifies a data structure (e.g., indicated by the fourteenth GUI element 610), a field of an address of the page (e.g., indicated by the thirteenth GUI element 608), and a field of the data structure (e.g., indicated by the fifteenth GUI element 612). The service platform customer instance generates the title by replacing the variable in the dynamic title with an entry in the data structure that is indicated by the value of the field of the address and by the value of the field of the data structure. The service platform customer instance then inserts the title into page data associated with the page.

For example, the page created by the third screen 500 includes the dynamic title "% item|Portal Catalog." In response to determining that the dynamic title includes the variable "% item," the service platform customer instance identifies the dynamic title variable definition created by the fourth screen 600 because the dynamic title variable definition is for a dynamic title variable named "% item." The service platform customer instance accesses the "Catalog Item" table indicated by the dynamic title variable definition and identifies a row of the table that corresponds to (e.g., has a value equal to) the value of sys_id for the page. To illustrate, if sys_id=radio in the URL of the page, the service platform customer instance identifies a row of the Catalog Item table corresponding to radio. The service platform customer instance replaces % tag in the title of the page with a value of a "Short Description" column of the row corresponding to radio as indicated by the dynamic title variable definition. Thus, if the "Short Description column of the radio row has a value of "Brand name radio," the service platform customer instance sets the title of the page to be "Brand name radio|Portal Catalog."

Referring to FIG. 7 a diagram of a fifth screen 700 of the GUI (e.g., the GUI 180) for configuring the portal is shown. The fifth screen 700 depicts a table of dynamic page title variable definitions that includes the dynamic page title variable definition created as described with reference to FIG. 6. For example, in response to selection of the sixteenth GUI element 614 (the submit button) of the fourth screen 600, the service platform customer instance (e.g., the service platform customer instance 120 or the service platform customer instance 202) may create or update the dynamic title variable definition based on entries of the fourth screen 600 and update the GUI to display the fifth screen 700. Thus, FIGS. 5-7 illustrate a GUI usable to create a page with a dynamic title. As described above, a page with a dynamic title that corresponds to dynamic content of the page may be identified more frequently by a search engine as compared to a page with a generic title. Accordingly, more traffic may be driven to the page with the dynamic title.

Figure 8:
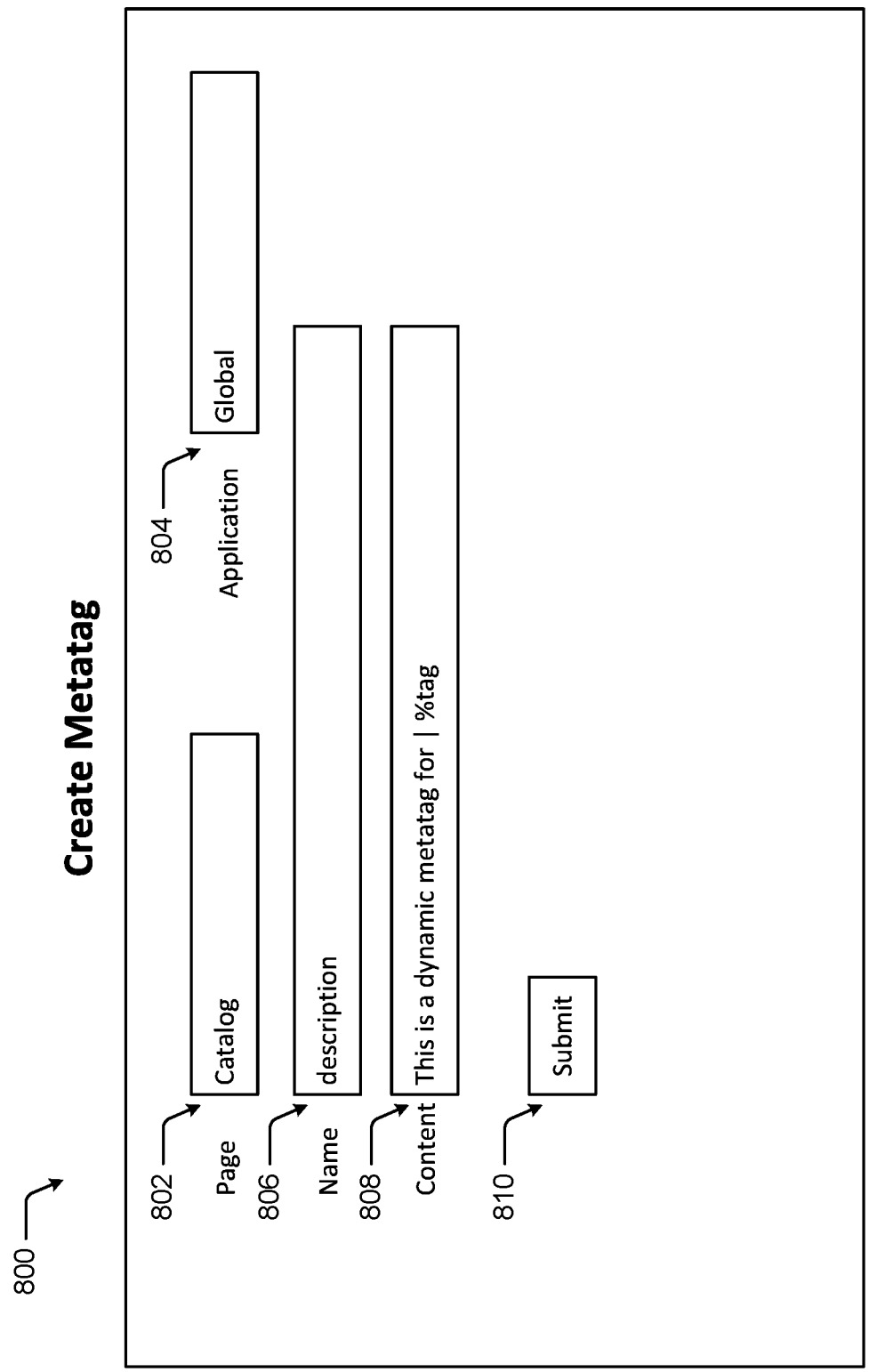
FIG. 8 is diagram of another screen of the for configuring the portal.

Referring to FIG. 8, a diagram of a sixth screen 800 of the GUI (e.g., the GUI 180) for configuring the portal is shown. The sixth screen 800 is usable to create a metatag for the portal. As explained above, the GUI may generate portal configuration data (e.g., the portal configuration data 182) based on values entered into the sixth screen 800. The portal configuration data generated based on the sixth screen 800 is used by a service platform customer instance (e.g., the service platform customer instance 120 or the service platform customer instance 202) to generate the page the metatag for the portal. A metatag may be embedded in an HTML file of a page and may describe some content of the page. Generally, a metatag embedded in HTML may have a name and content. An example of a metatag is <Name="Content">, where Name is the name of the metatag and "Content" is the content of the metatag. As described above, content of a page may be dynamic. Content of the metatag defined using sixth screen 800 may also be dynamic. Accordingly, the content of the metatag may accurately reflect content of the page. Therefore, search engines that determine search results based on metatags may more easily identify the content of the page.

The sixth screen 800 includes GUI elements 802-810. The sixteenth GUI element 802 is a text box in which one a page name may be entered. The service platform customer instance (e.g., the service platform customer instance 120 or the service platform customer instance 202) uses the metatag created based on the sixth screen 800 in the page indicated by the sixteenth GUI element 802. In the illustrated example, the sixteenth GUI element 802 has been populated with the string "Catalog." Accordingly, the metatag defined in the sixth screen 800 is to be used in the page "Catalog." As described above, the page "Catalog" may include dynamically generated (e.g., by the service platform customer instance) content.

The seventeenth GUI element 804 is a text box in which one or more portals may be defined. The service platform customer instance (e.g., the service platform customer instance 120 or the service platform customer instance 202) uses the metatag created based on the sixth screen 800 with portals indicated by the seventeenth GUI element 804. In the illustrated example, the seventeenth GUI element 804 has been populated with the string "Global." "Global" indicates that the metatag defined in the sixth screen 800 is to be used with all portals associated with the service platform customer instance.

The eighteenth GUI element 806 is a text box in which a name of the metatag may be defined. In the illustrated example, the eighteenth GUI element 806 has been populated with the string "description."

The nineteenth GUI element 808 is a text box in which content of the metatag may be defined. The content of the metatag may be dynamic may be dynamic. Dynamic content includes a variable to be resolved by the service platform customer instance. As explained above the symbol "%" may be used to denote a variable. In the illustrated example, the nineteenth GUI element 808 has been populated with the string "This is a dynamic metatag for|% tag." Accordingly, the content of the metatag is dynamic and is to be resolved by the service platform customer instance. The service platform customer instance resolves dynamic metatag content based on dynamic metatag variable definitions described below. While not shown, in some examples, the name of the metatag may also be dynamic.

The twentieth GUI element 810 is a submit button. In response to selection of the submit button, the GUI (e.g., the portal configuration GUI 180) generates portal configuration data (e.g., the portal configuration data 182) based on content of the GUI elements 802-810. The portal configuration data is transmitted by the client device (e.g., the client device 104A) displaying the GUI to the service platform customer instance (e.g., the service platform customer instance 120 or the service platform customer instance 202). Based on the portal configuration data, the service platform customer instance creates the metatag. The service platform customer instance may then insert the metatag into HTML of a page responsive to additional portal configuration data.

Figure 9:
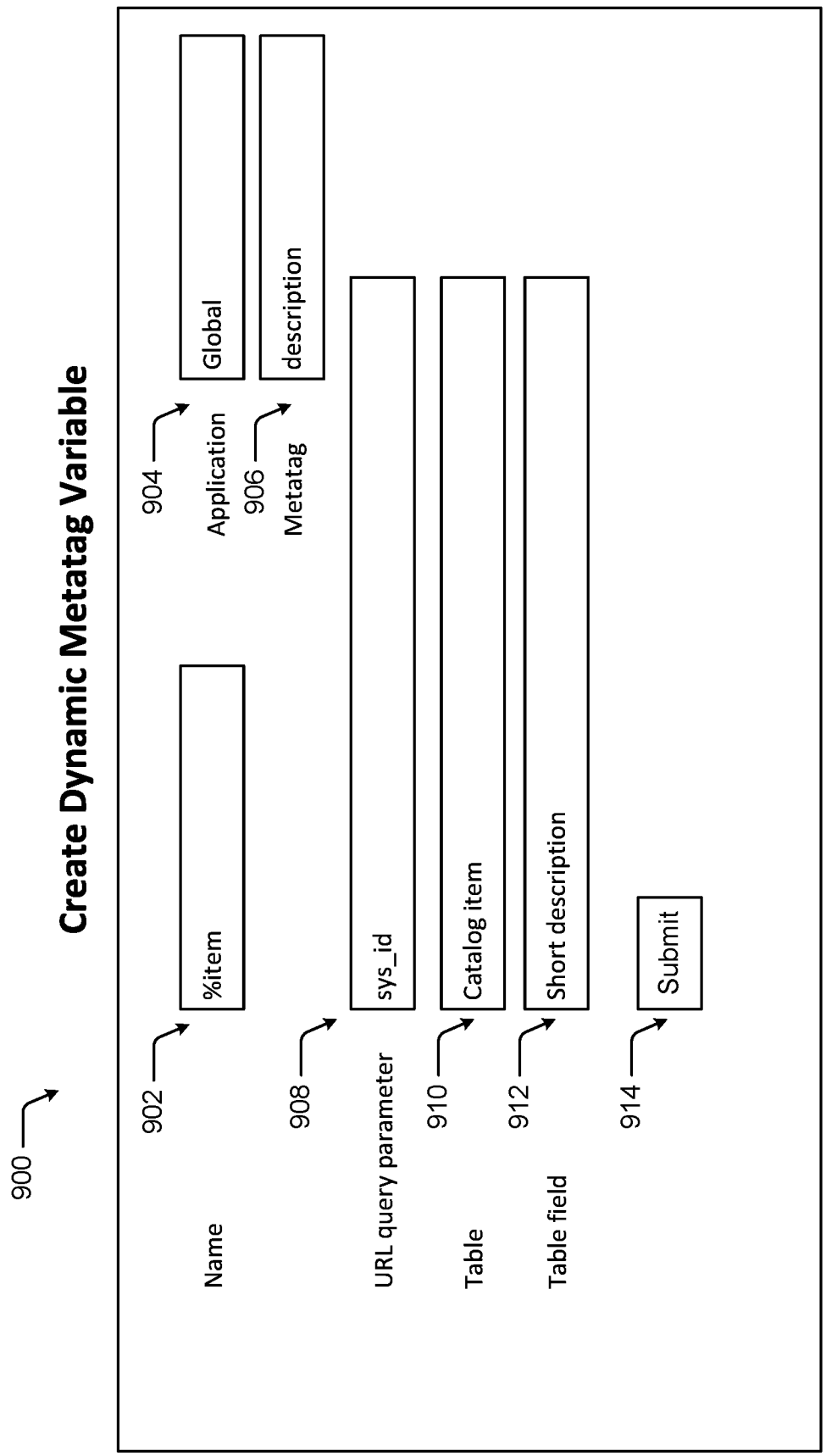
FIG. 9 is diagram of another screen of the for configuring the portal.

Referring to FIG. 9, a diagram of a seventh screen 900 of the GUI (e.g., the GUI 180) for configuring the portal is shown. The seventh screen 900 is usable to create a dynamic metatag variable definition (e.g., an entry in a table) used by the service platform customer instance to resolve a dynamic metatag. As explained above, the GUI may generate portal configuration data (e.g., the portal configuration data 182) based on values entered into the seventh screen 900. The portal configuration data generated based on the seventh screen 900 is used by the service platform customer instance (e.g., the service platform customer instance 120 or the service platform customer instance 202) to generate dynamic metatag variable definitions used to resolve dynamic metatags. The seventh screen 900 includes GUI elements 902-914 that correspond to the GUI elements 602-614 of the fourth screen 600. That is, the twenty first GUI element 902 corresponds to the tenth GUI element 602, the twenty second GUI element 904 corresponds to the eleventh GUI element 604, the twenty third GUI element 906 corresponds to the twelfth GUI element 606, the twenty fourth GUI element 908 corresponds to the thirteenth GUI element 608, the twenty fifth GUI element 910 corresponds to the fourteenth GUI element 610, the twenty sixth GUI element 912 corresponds to the fifteenth GUI element 612, and the twenty seventh GUI element 914 corresponds to the sixteenth GUI element 614. Thus, in response to selection of the twenty seventh GUI element 914, the GUI (e.g., the portal configuration GUI 180) generates portal configuration data (e.g., the portal configuration data 182) based on content of the GUI elements 902-912. The portal configuration data is transmitted by the client device (e.g., the client device 104A) displaying the GUI to the service platform customer instance (e.g., the service platform customer instance 120 or the service platform customer instance 202). Based on the portal configuration data, the service platform customer instance creates the dynamic metatag variable definition. The service platform customer instance may use the dynamic metatag variable definition defined by the seventh screen 900 to resolve dynamic content (or a name) of a metatag.

Resolving the dynamic content of the metatag includes identifying a variable in the dynamic content. The service platform customer instance identifies a dynamic metatag variable definition (e.g., defined in the seventh screen 900) based on the variable. Based on the dynamic metatag variable definition, the service platform customer instance identifies a data structure (e.g., indicated by the twenty fifth GUI element 910), a field of an address of the page (e.g., indicated by the twenty fourth GUI element 908), and a field of the data structure (e.g., indicated by the twenty sixth GUI element 912). The service platform customer instance generates the metatag content by replacing the variable in the dynamic metatag content with an entry in the data structure that is indicated by the value of the field of the address and by the value of the field of the data structure. The service platform customer instance then inserts the metatag content into page data that includes the metatag.

For example, the metatag created by the sixth screen 800 includes the dynamic metatag content "This is a dynamic metatag for|% tag." In response to determining that the dynamic metatag content includes the variable "% item," the service platform customer instance identifies the dynamic metatag variable definition created by the seventh screen 900 because the dynamic metatag variable definition is for a dynamic metatag variable named "% item." The service platform customer instance accesses the "Catalog Item" table indicated by the dynamic metatag variable definition and identifies a row of the table that corresponds to (e.g., has a value equal to) the value of sys_id for the page. To illustrate, if sys_id=radio in the URL of the page that includes the metatag, the service platform customer instance identifies a row of the Catalog Item table corresponding to radio. The service platform customer instance replaces % tag in the content of the metatag with a value of a "Short Description" column of the row corresponding to radio as indicated by the dynamic metatag variable definition. Thus, if the "Short Description column of the radio row has a value of "Brand name radio," the service platform customer instance sets the content of the metatag to be "This is a dynamic metatag for|Brand name radio."

Referring to FIG. 10 a diagram of a eighth screen 1000 of the GUI (e.g., the GUI 180) for configuring the portal is shown. The eighth screen 1000 depicts a table of dynamic metatag variable definitions that includes the dynamic metatag variable definition created as described with reference to FIG. 9. For example, in response to selection of the twenty seventh GUI element 914 of the seventh screen 900, the service platform customer instance (e.g., the service platform customer instance 120 or the service platform customer instance 202) may create or update the dynamic metatag variable definition based on entries of the seventh screen 900 and update the GUI to display the eighth screen 1000. Thus, FIGS. 8-10 illustrate a GUI usable to create metatags with dynamic content. Dynamic metatag content that corresponds to dynamic content of a page may be identified by a search engine more frequently as compared to a page with a generic title. Accordingly, more traffic may be driven to the page with the dynamic title.

Figure 11:
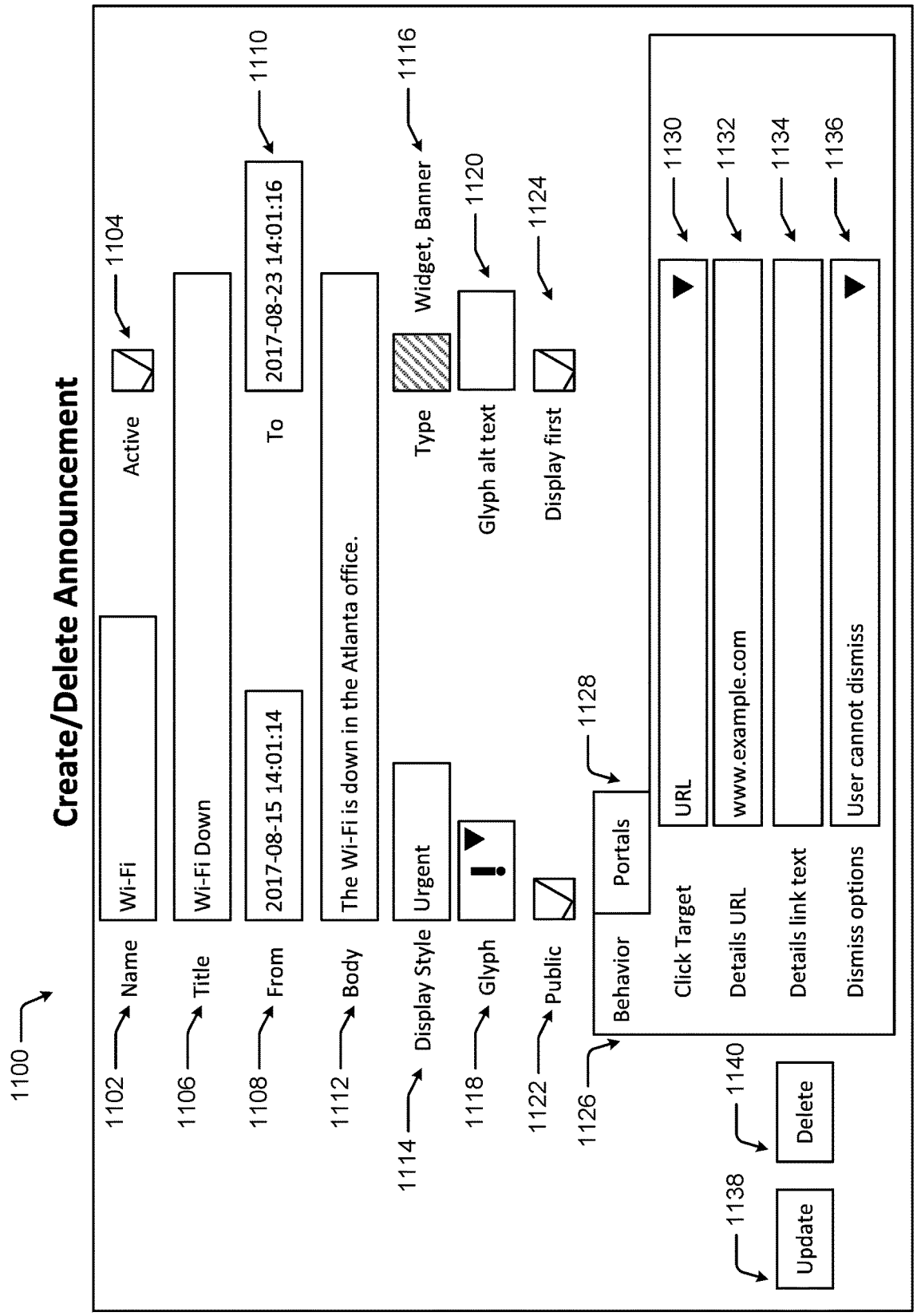
FIG. 11 is diagram of another screen of the for configuring the portal.

Referring to FIG. 11, a diagram of a ninth screen 1100 of the GUI (e.g., the GUI 180) for configuring the portal is shown. The ninth screen 1100 is usable to create or delete an announcement to be displayed at one or more devices that access the portal. As explained above, the GUI may generate portal configuration data (e.g., the portal configuration data 182) based on values entered into the ninth screen 1100. The portal configuration data generated based on the ninth screen 1100 is used by the service platform customer instance (e.g., the service platform customer instance 120 or the service platform customer instance 202) to generate announcement data.

The ninth screen 1100 includes GUI elements 1102-1140. The twenty eighth GUI element 1102 is a text box in which a name of the announcement may be defined. In the illustrated example, the twenty eighth GUI element 1102 has been populated with a string "Wi-Fi."

The twenty ninth GUI element 1104 is a checkbox in which an active status of the announcement may be defined. Using the twenty ninth GUI element 1104 the announcement may be set to an active or inactive status. The service platform customer instance (e.g., the service platform customer instance 120 or the service platform customer instance 202) ignores inactive announcements when determining whether to include announcements in portal page data. In the example of FIG. 11, the twenty ninth GUI element 1104 has been set to indicate the announcement is active.

The thirtieth GUI element 1106 is a text box in which a title of the announcement may be defined. The title may be rendered by a client device (e.g., the client device 104A) receiving page data (e.g., the portal page 184) that includes the announcement. In some implementations, the title is a required field for the announcement. For example, the service platform customer instance may not create an announcement based on portal configuration data that does not include a valid title. In the illustrated example, the thirtieth GUI element 1106 has been populated with the string "Wi-Fi Down."

The thirty first GUI element 1108 and the thirty second GUI element 1110 are text boxes usable to define a time range during which an announcement is to be active. The thirty first GUI element 1108 is usable to define a start date, and the thirty second GUI element 1110 is usable to define an end date. In some implementations, the service platform customer instance is configured to purge the announcement identified from databases (e.g., the database instances 118A-B) of the service platform customer instance upon occurrence of the end date or a set time after the end date. In the illustrated example, the thirty first GUI element 1108 and the thirty second GUI element 1110 have been populated with values indicating an active time range of 2:01:14 AM on Aug. 15, 2017 to 2:01:16 AM on Aug. 23, 2017. In some implementations, the ninth screen 1100 further includes options to select a time zone associated with the time range.

The thirty third GUI element 1112 is a text box usable to define a body of the announcement. The body may be rendered by a client device (e.g., the client device 104A) receiving page data (e.g., the portal page 184) that includes the announcement. In some implementations, the body is an optional field for the announcement. In the illustrated example, the thirty third GUI element 1112 has been populated with the string "The Wi-Fi is down in the Atlanta office."

The thirty fourth GUI element 1114 is a text box usable to define a display style of the advertisement. In the illustrated example, the thirty fourth GUI element 1114 has been populated with the string "Urgent." "Urgent" may be associated with particular set of style options. Style options may include font, background color, etc. In some implementations, style options are individually selectable.

The thirty fifth GUI element 1116 is selection box usable to define how the advertisement is displayed. For example, the thirty fifth GUI element 1116 may be usable to define whether the advertisement is to be displayed as a banner at the top of a page, as widget embedded in the page, or a combination thereof. In the illustrated example, the thirty fifth GUI element 1116 has been locked and widget and banner have been automatically selected in response to the thirty fourth GUI element 1114 being set to "Urgent."

The thirty sixth GUI element 1118 is a dropdown box usable to select a glyph (e.g., an icon) associated with the advertisement. The glyph may be rendered by a client device (e.g., the client device 104A) receiving page data (e.g., the portal page 184) that includes the announcement.

The thirty seventh GUI element 1120 is a text box usable to define alt text associated with the glyph. The alt text may be rendered by the client device (e.g., the client device 104A) receiving the page data (e.g., the portal page 184) that includes the announcement in response to a mouse over event associated with the glyph.

The thirty eighth GUI element 1122 is a checkbox usable to define whether the announcement is public or targeted. The service platform customer instance is configured to send public announcements to each user accessing a portal associated with the announcement. Targeted announcements are described further below with reference to FIGS. 12 and 13. In the illustrated example, the thirty eighth GUI element 1122 is set to public.

The thirty ninth GUI element 1124 is a checkbox usable to define whether the announcement is to be displayed first. The service platform customer instance is configured to cause announcements to be displayed based on a sorting order. The sorting order may be ascending order or descending order based on the start date (e.g., defined by the thirty first GUI element 1108) or based on the end date (e.g., defined by the thirty second GUI element 1110). The service platform customer instance is configured to override the sorting order and cause the announcement to be displayed first (e.g., in a top position) in response to portal configuration data indicating selection of the thirty ninth GUI element 1124. In the illustrated example, the thirty ninth GUI element 1124 has been automatically selected in response to the thirty fourth GUI element 1114 being set to "Urgent."

The fortieth GUI element 1126 is a tab labeled behavior and the forty first GUI element 1128 is a tab labeled portals. The fortieth GUI element includes the GUI elements 1130-1136 that are usable to define behaviors associated with the announcement. While not illustrated, the forty first GUI element 1128 includes GUI elements usable to define one or more portals associated with the announcement. The service platform customer instance is configured to insert the announcement into pages associated with portals identified in the forty first GUI element 1128.

The forty second GUI element 1130 is a drop down box usable to select an action triggered by a user clicking on a click target of the advertisement. The forty second GUI element 1130 may identify "Page," "URL," or "None." "Page" indicates that a browser of the client device displaying the advertisement is to be routed to another page included in the service platform customer instance and indicated by the forty third GUI element 1132. "URL" indicates that the browser of the client device displaying the advertisement is to be routed to a web page external to the service platform customer instance and indicated by the forty third GUI element 1132. "None" indicates that the user clicking on the click target of the advertisement is to have no effect.

The forty fourth GUI element 1134 is a text box usable to define link text. The link text may be rendered by the client device (e.g., the client device 104A) receiving the page data (e.g., the portal page 184) that includes the announcement. The link text may be optional. In response to the announcement including link text, the service platform customer instance sets the link text as the click target of the announcement. In response to the announcement not including link text, the service platform customer instance may set the click target to be the body and/or the title of the announcement. In response to the announcement not including link text or a body, the service platform customer instance may set the click target to be the title.

The forty fifth GUI element 1136 is a drop down box usable to define dismiss options associated with the announcement. The dismiss options include a "user cannot dismiss," option a "user can dismiss for current session only" option, and a "user can dismiss-no redisplay" option. In the illustrated example, the forty fifth GUI element 1136 is automatically set to the "user cannot dismiss option" based on the thirty fourth GUI element 1114 being set to "Urgent."

In response to selection of the "user cannot dismiss" option, the service platform customer instance is configured to not include an option for the user to dismiss the announcement from the page the announcement is displayed with.

In response to selection of the "user can dismiss for current session only" option or the "user can dismiss-no redisplay" option, the service platform customer instance is configured to include a dismissal option to be rendered by the client device displaying the announcement. In response to receiving a selection of the dismissal option, the client device ceases to display the announcement. In cases where the announcement is associated with the "user can dismiss for current session only" option, the service platform customer instance includes the announcement with portal page data the next time the user access a portal associated with the announcement.

In cases where the announcement is associated with the "user can dismiss-no redisplay" option, selection of the dismissal option causes the client device to send a dismissal notice to the service platform customer instance. In response to the dismissal notice, the service platform customer instance adds the announcement to marks the announcement as dismissed and adds the announcement to a dismissal table associated with the user. The next time the user accesses a portal associated with the announcement, the service platform customer instance will not include the announcement with page data because the announcement is marked as dismissed for the user. A page of the portal may include a widget configured to receive or request the announcements stored in the dismissal table from the service platform customer instance. Accordingly, a user may access an announcement after dismissing the announcement. In some examples, the service platform customer instance purges announcements stored in the dismissal table from the dismissal table upon occurrence of the end time of the announcement or a set time after the end time.

The forty sixth GUI element 1138 is an update button. In response to selection of the update button, the GUI (e.g., the portal configuration GUI 180) generates portal configuration data (e.g., the portal configuration data 182) based on content of the GUI elements 1102-1136. The portal configuration data is transmitted by the client device (e.g., the client device 104A) displaying the GUI to the service platform customer instance (e.g., the service platform customer instance 120 or the service platform customer instance 202). Based on the portal configuration data, the service platform customer instance updates or creates the announcement.

The forty seventh GUI element 1140 is a delete button. In response to selection of the delete button, the GUI (e.g., the portal configuration GUI 180) generates portal configuration data (e.g., the portal configuration data 182) deleting the announcement associated with the ninth screen 1100. The portal configuration data is transmitted by the client device (e.g., the client device 104A) displaying the GUI to the service platform customer instance (e.g., the service platform customer instance 120 or the service platform customer instance 202). In response, to the portal configuration data, the service platform customer instance deletes the announcement.

Figure 12:
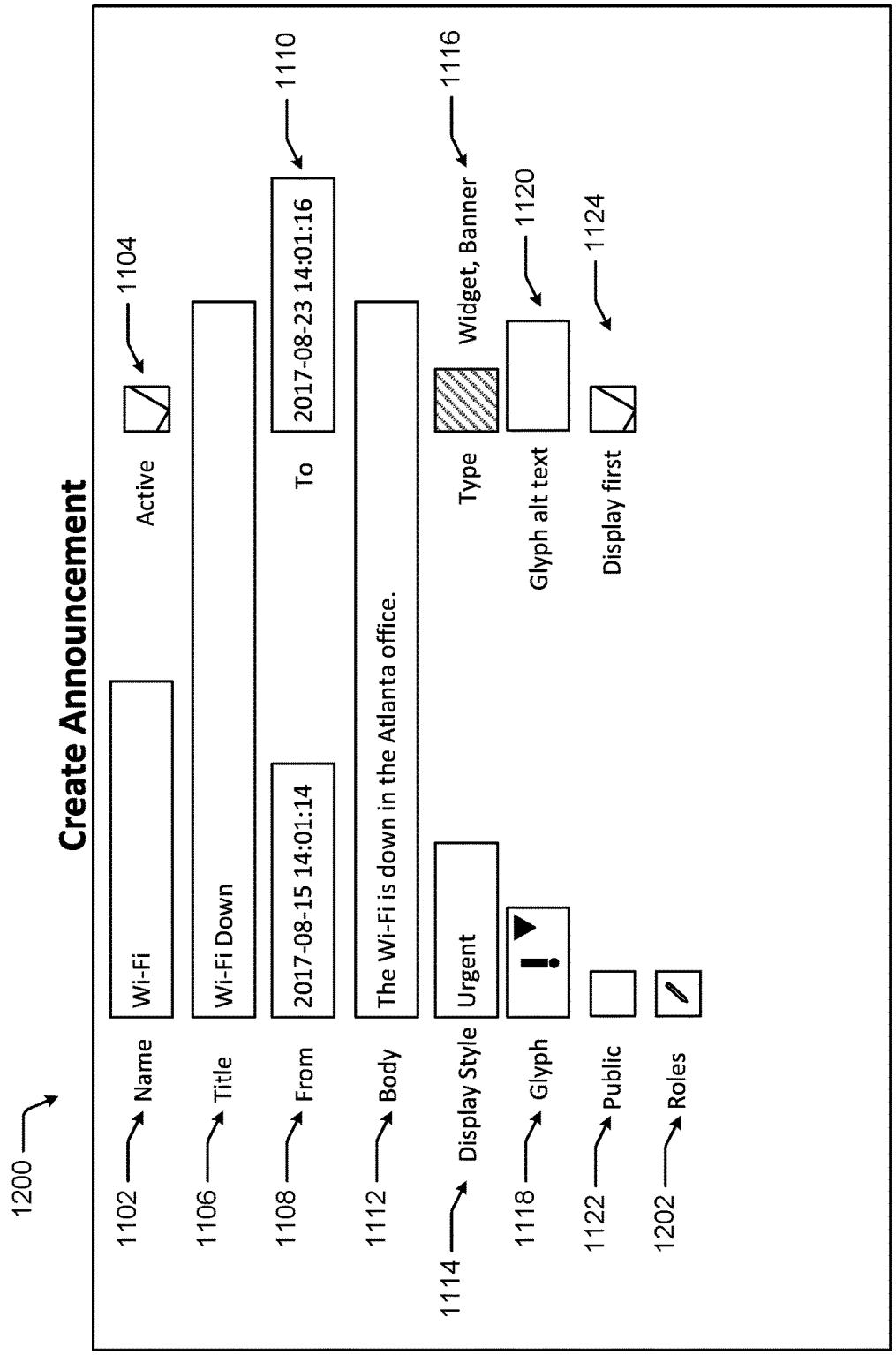
FIG. 12 is diagram of another screen of the for configuring the portal.

Referring to FIG. 12, a diagram of a tenth screen 1200 of the GUI (e.g., the GUI 180) for configuring the portal is shown. The tenth screen 1200 corresponds to the ninth screen 1100 except that the thirty eighth GUI element 1122 is not checked and an additional forty eighth GUI element 1202 is included. While not shown, the tenth screen 1200 includes the GUI elements 1124-1140. As described above, unchecking the thirty eighth GUI element 1122 indicates that the announcement is to be a targeted announcement. The forty eighth GUI element 1202 is a roles button. Selection of the roles button enables identification of users to be targeted by the targeted announcement, as described with reference to FIG. 13. FIG. 13 depicts an eleventh screen 1300 of the GUI for configuring the portal. The eleventh screen 1300 includes a forty ninth GUI element 1302 usable to select one or more criteria. The service platform customer instance is configured to send the announcement to a client device operated by a user who satisfies the selected criteria. In the illustrated example, the forty ninth GUI element 1302 supports selection of roles. However, any criteria (e.g., height, employment length, last name, location, etc.) may be supported by the forty ninth GUI element 1302. The forty ninth GUI element 1302 includes a done button configured to return to the tenth screen 1200.

Figure 14:
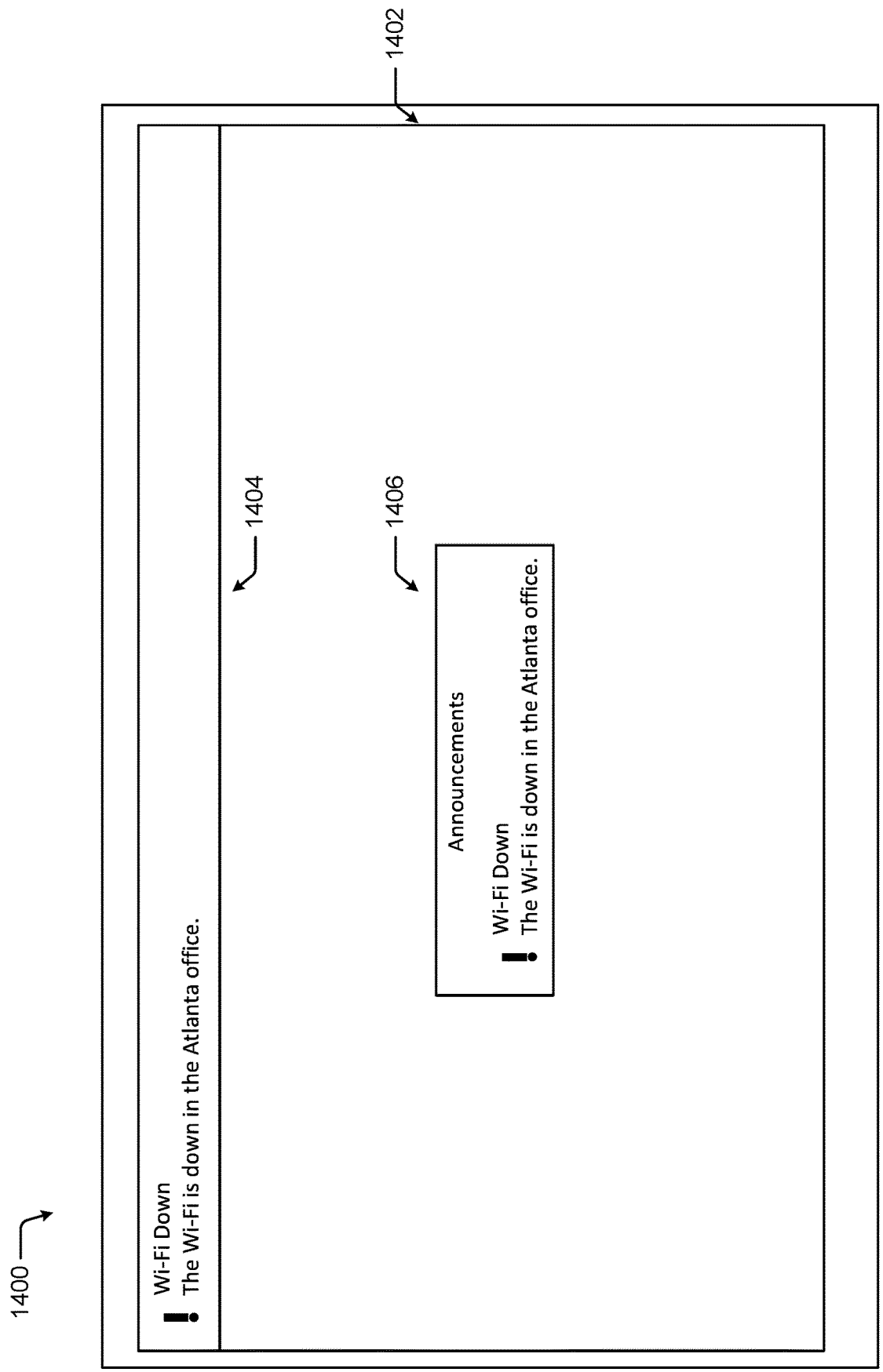
FIG. 14 is diagram of a display screen showing announcements included in a portal page.

Referring to FIG. 14, a diagram 1400 of a client display including an announcement is shown. As illustrated in FIG.

14, a page 1402 (e.g., the portal page 184) is displayed with the announcement displayed as a widget 1406 embedded in the page 1402 and as a banner 1404. The client display is generated at a client device (e.g., the client device 104A) in response to the client device receiving page data representing the page 1402 and the announcement.

In an illustrative use case, a user of the client device accesses a portal provided by a service platform customer instance (e.g., the service platform customer instance 120). The service platform customer instance identifies one or more attributes of the user (e.g., a role, an age, etc.). The attributes may be stored in a database instance (e.g., the database instances 118A-B) of the service platform customer instance, and the service platform customer instance may identify the user based on log-in information provided by the user in order to gain access to the portal. The service platform customer instance identifies active announcements associated with the portal for which the user attribute(s) satisfy target criteria associated with the announcement. In response to determining that the announcement is active and that the user attribute(s) satisfy the target criteria, the service platform customer instance includes announcement data representing the announcement in page data associated with an initial page (e.g., the portal page 184) of the portal. Based on the page data, the client device generates the display screen illustrated in FIG. 14. Thus, FIGS. 11-14 describe a configurable announcement feature of a service platform customer instance. The announcement feature may enable a customer of a service platform network to publish announcements to users who access one or more portals.

Figure 15:
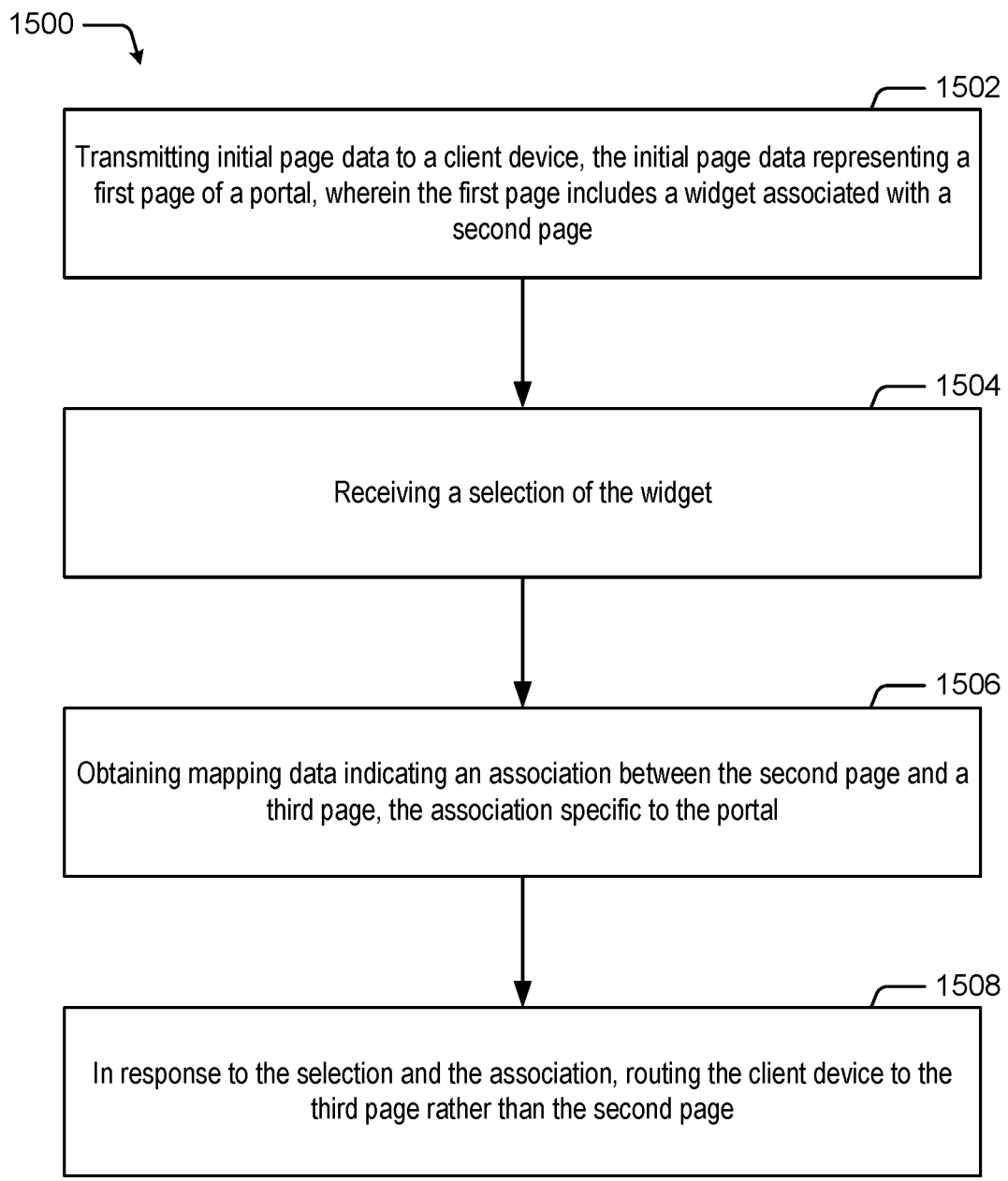
FIG. 15 is a flowchart of a method for managing a portal.

Referring to FIG. 15, a flowchart illustrating a method 1500 of providing a portal is shown. The method 1500 includes transmitting initial page data to a client device, the initial page data representing a first page of a portal, where the first portal includes a widget associated with a second page, at 1502. For example, the service platform customer instance 202 may transmit initial page data 222 to the client device 204. The initial page data 222 represents the first page 208 of the portal 206. The first page 208 includes the widget 210 that links to the second page 212.

The method 1500 further includes receiving a selection of the widget, at 1504. For example, the service platform customer instance 202 may receive the selection 224 of the widget 210 from the client device 204. The selection 224 includes a reference to the widget 210 and/or a link to the second page 212.

The method 1500 further includes obtaining mapping data indicating an association between the second page and a third page, the association specific to the portal, at 1506. For example, the service platform customer instance 202 stores the mapping data 214 that includes the association 216. The association 216 indicates that requests for the second page 212 that originate from the portal 206 are to be routed to the third page 220 instead of the second page 212. As explained above, the mapping data 214 may be received from a customer network (e.g., the customer network 102) as part of portal configuration data (e.g., the portal configuration data 182).

The method 1500 further includes, in response to the selection and the association, routing the client device to the third page rather than the second page, at 1508. For example, the service platform customer instance 202 may send the response data 226 to the client device 204 based on the selection 224 and the association 216. The response data 226 routes the client device 204 to the third page 220 rather than to the second page 212. The response data 226 may include a link to the third page 220 and/or content of the third page 220.

Thus, FIG. 15 illustrates a method of operating a portal that provides a redirect capability. The redirect capability may decrease difficulty associated with developing and maintaining the portal because individual widgets in a group of widgets associated with a page need not be updated when a new page is introduced to replace the page.

Figure 16:
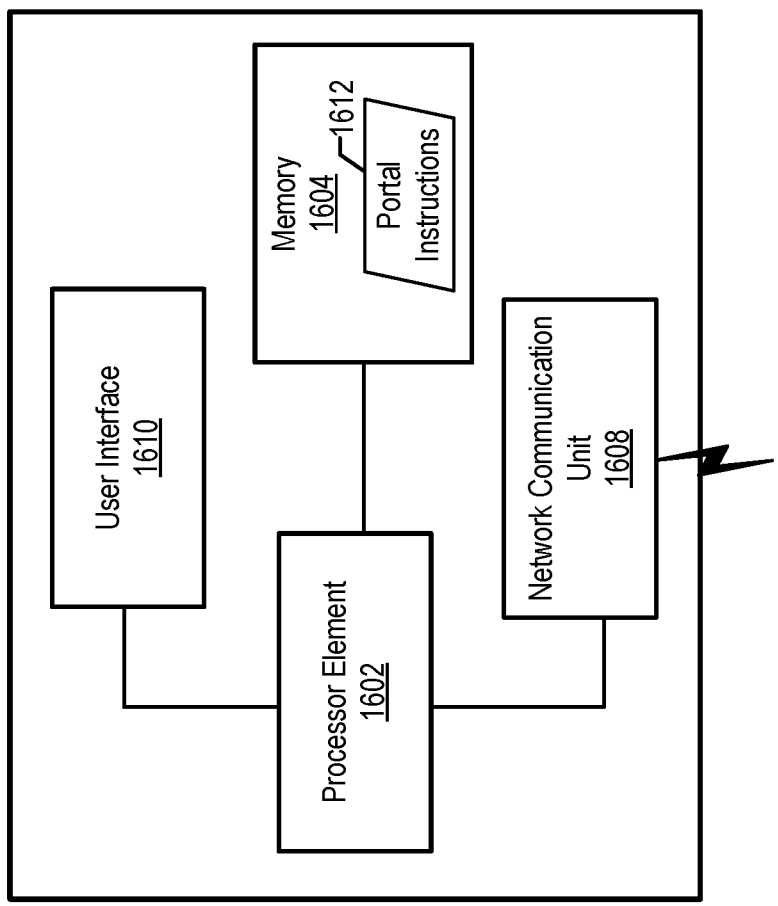
FIG. 16 is a block diagram illustrating a computing device for use with techniques described herein.

Referring now to FIG. 16, a block diagram illustrates a computing device 1600 that may be used for implementing the techniques described herein in accordance with one or more embodiments. For example, the computing device 1600 illustrated in FIG. 16 could represent a client device or a physical server device. The computing device may correspond to one or more of the client devices 104A-C, the MID server 106, the device(s) that provide the service platform customer instance 120, the device(s) that provide the service platform customer instance 202, the client device 204, or a combination thereof. As shown in FIG. 16, the computing device 1600 can include one or more input/output devices, such as a network communication unit 1608 that could include a wired communication component and/or a wireless communications component, which can be coupled to processor element 1602. The network communication unit 1608 can utilized any of a variety of standardized network protocols, such as Ethernet, TCP/IP, to name a few of many protocols, to effect communications between devices and comprise one or more transceiver(s) that utilize the Ethernet, power line communication (PLC), Wi-Fi, and/or other communication methods.

The computing device 1600 includes a processor element 1602 that contains one or more hardware processors, where each hardware processor may have a single or multiple processor cores. In one embodiment, the processor element 1602 may include at least one shared cache that store data (e.g., computing instructions) that are utilized by one or more other components of processor element 1602. For example, the shared cache may be locally cache data stored in a memory for faster access by components of the processor elements 1602. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 16, the processor element 1602 may also include one or more other types of hardware processing components, such as graphics processing units (GPU), application specific integrated circuits (ASICs), field-programmable gate arrays (FPGAs), and/or digital signal processors (DSPs).

FIG. 16 illustrates that memory 1604 may be operatively coupled to processor element 1602. Memory 1604 may be a non-transitory medium configured to store various types of data. For example, memory 1604 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution. In the illustrated example, the memory 1604 stores portal instructions 1612. The portal instructions 1612 may be executable by the processor element 1602 to perform any of the operations of methods described with respect to FIGS. 1-15.

Persons of ordinary skill in the art are aware that software programs may be developed, encoded, and compiled in a variety computing languages for a variety software platforms and/or operating systems and subsequently loaded and executed by processor element 1602. In one embodiment, the compiling process of the software program may transform program code written in a programming language to another computer language such that the processor element 1602 is able to execute the programming code. For example, the compiling process of the software program may generate an executable program that provides encoded instructions (e.g., machine code instructions) for processor element 1602 to accomplish specific, non-generic, particular computing functions.

After the compiling process, the encoded instructions may then be loaded as computer executable instructions or process steps to processor element 1602 from storage (e.g., memory 1604) and/or embedded within the processor element 1602 (e.g., cache). Processor element 1602 can execute the stored instructions or process steps in order to perform instructions or process steps to transform the computing device into a non-generic, particular, specially programmed machine or apparatus. Stored data, e.g., data stored by a storage device, can be accessed by processor element 1602 during the execution of computer executable instructions or process steps to instruct one or more components within the computing device 1600.

A user interface 1610 can include a display, positional input device (such as a mouse, touchpad, touchscreen, or the like), keyboard, or other forms of user input and output devices. The user interface 1610 can be coupled to processor element 1602. Other output devices that permit a user to program or otherwise use the computing device can be provided in addition to or as an alternative to network communication unit 1608. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 1600 may comprise other components well known in the art, such as sensors, powers sources, and/or analog-to-digital converters, not explicitly shown in FIG. 16. For ease of discussion, FIG. 16 explanation of these other components well known in the art.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A method comprising:
    setting a title of a first page of a first portal, wherein setting the title comprises resolving a dynamic title of the first page by:
        identifying a variable in the dynamic title;
        identifying a data structure and a field of an address of the first page based on the variable; and
        generating the title by replacing the variable in the dynamic title with an entry in the data structure indicated by a value of the field;
    inserting the title into initial page data of the first page, wherein the initial page data represents the first page of the first portal;
    transmitting the initial page data from a service platform customer instance to a first client device, wherein the first page includes a first widget associated with a second page, wherein a use of the first portal is indicative of a first user associated with the first client device having a first role;
    receiving, from the first client device, a first selection of the first widget from within the first page;
    obtaining a first mapping data record stored in a mapping data table, wherein the first mapping data record specifies that selection of the first widget from the first portal reroutes the first client device to a customized version of the second page based on the first role of the first user, wherein the customized version of the second page is customized based on the first role of the first user; and
    in response to the first selection of the first widget associated with the second page, and based on the first mapping data record, rerouting the first client device to the customized version of the second page instead of a default version of the second page.

2. The method of claim 1, comprising:
    receiving, from a second client device, a second selection of a second widget included in a fourth page of a second portal, wherein the second widget is associated with the second page; and
    in response to a determination that the mapping data table does not include a mapping data record that modifies routing to the second page from the second portal, routing the second client device to the default version of the second page in response to the second selection.

3. The method of claim 1, wherein rerouting the first client device to the customized version of the second page instead of the default version of the second page includes sending a uniform resource locator (URL) identifying a location of the customized version of the second page to the first client device.

4. The method of claim 1, wherein rerouting the first client device to the customized version of the second page instead of the default version of the second page includes sending content of the customized version of the second page to the first client device.

5. The method of claim 1, comprising setting a metatag of the first page prior to transmitting the initial page data, wherein setting the metatag includes:
    resolving a dynamic metatag of the first page by:
        identifying an additional variable in the dynamic metatag;
        identifying an additional data structure and an additional field of an additional address of the first page based on the additional variable; and
        generating the metatag by replacing the additional variable in the dynamic metatag with an additional entry in the additional data structure indicated by an additional value of the additional field; and inserting the metatag into the initial page data.

6. The method of claim 1 comprising:

identifying the first role of the first user associated with the first client device; and in response to the first role of the first user satisfying criteria associated with announcement data, including the announcement data in the initial page data.

7. A computer-readable storage device storing instructions that, when executed by one or more processors, cause the one or more processors to perform operations comprising:

setting a metatag of a first page of a first portal, wherein setting the metatag comprises resolving a dynamic metatag of the first page by:

identifying a variable in the dynamic metatag;

identifying a data structure and a field of an address of the first page based on the variable; and generating the metatag by replacing the variable in the dynamic metatag with an entry in the data structure indicated by a value of the field; and inserting the metatag into initial page data of the first page, wherein the initial page data represents the first page of the first portal;

transmitting the initial page data from a service platform customer instance to a first client device, wherein the first page includes a first widget associated with a second page, and wherein a use of the first portal is indicative of a first user associated with the first client device having a first role;

receiving, from the first client device, a first selection of the first widget from within the first page;

obtaining a first mapping data record stored in a mapping data table, wherein the first mapping data record specifies that selection of the first widget from the first portal reroutes the first client device to a customized version of the second page based on the first role of the first user, wherein the customized version of the second page is customized based on the first role of the first user; and in response to the first selection of the first widget associated with the second page, and based on the first mapping data record, rerouting the first client device to the customized version of the second page instead of a default version of the second page.

8. The computer-readable storage device of claim 7, wherein the operations comprise:

receiving, from a second client device, a second selection of a second widget included in a fourth page of a second portal, wherein the second widget is associated with the second page; and in response to a determination that the mapping data table does not include a mapping data record that modifies routing to the second page from the second portal, routing the second client device to the default version of the second page in response to the second selection.

9. The computer-readable storage device of claim 7, wherein rerouting the first client device to the customized version of the second page instead of the default version of the second page includes sending a uniform resource locator (URL) identifying a location of the customized version of the second page to the first client device.

10. The computer-readable storage device of claim 7, wherein rerouting the first client device to the customized version of the second page instead of the default version of the second page includes sending content of the customized version of the second page to the first client device.

11. The computer-readable storage device of claim 7, wherein the operations comprise setting a title of the first page prior to transmitting the initial page data, and wherein setting the title includes:

resolving a dynamic title of the first page by:

identifying an additional variable in the dynamic title;

identifying an additional data structure and an additional field of an additional address of the first page based on the additional variable; and generating the title by replacing the additional variable in the dynamic title with an additional entry in the additional data structure indicated by an additional value of the additional field; and inserting the title into the initial page data.

12. The computer-readable storage device of claim 7, wherein the operations comprise:

identifying the first role of the first user associated with the first client device; and in response to the first role of the first user satisfying criteria associated with announcement data, including the announcement data in the initial page data.

13. A system comprising:

one or more processors; and one or more memory devices storing instructions that, when executed by the one or more processors, cause the one or more processors to perform operations comprising:

setting a title of a first page of a first portal, wherein setting the title comprises resolving a dynamic title of the first page by:

identifying a variable in the dynamic title;

identifying a data structure and a field of an address of the first page based on the variable; and generating the title by replacing the variable in the dynamic title with an entry in the data structure indicated by a value of the field;

inserting the title into initial page data of the first page, wherein the initial page data represents the first page of the first portal;

transmitting the initial page data from a service platform customer instance to a first client device, wherein the first page includes a first widget associated with a second page, and wherein a use of the first portal is indicative of a first user associated with the first client device having a first role;

receiving, from the first client device, a first selection of the first widget from within the first page;

obtaining a first mapping data record stored in a mapping data table, wherein the first mapping data record specifies that selection of the first widget from the first portal reroutes the first client device to a customized version of the second page based on the first role of the first user, wherein the customized version of the second page is customized based on the first role of the first user; and in response to the first selection of the first widget associated with the second page, and based on the first mapping data record, rerouting the first client device to the customized version of the second page instead of a default version of the second page.

14. The system of claim 13, wherein the operations comprise:

receiving, from a second client device, a second selection of a second widget included in a fourth page of a second portal, wherein the second widget is associated with the second page; and in response to a determination that the mapping data table does not include a mapping data record that modifies routing to the second page from the second portal, routing the second client device to the default version of the second page in response to the second selection.

15. The system of claim 13, wherein rerouting the first client device to the customized version of the second page instead of the default version of the second page includes sending a uniform resource locator (URL) identifying a location of the customized version of the second page to the first client device.

16. The system of claim 13, wherein rerouting the first client device to the customized version of the second page instead of the default version of the second page includes sending content of the customized version of the second page to the first client device.

17. The system of claim 13, wherein the operations comprise setting a metatag of the first page prior to transmitting the initial page data, and wherein setting the metatag includes:
- resolving a dynamic metatag of the first page by:
  - identifying an additional variable in the dynamic metatag;
  - identifying an additional data structure and an additional field of an additional address of the first page based on the additional variable; and
  - generating the metatag by replacing the additional variable in the dynamic metatag with an additional entry in the additional data structure indicated by an additional value of the additional field; and
- inserting the metatag into the initial page data.

* * * * *